US011255603B2

(12) United States Patent
Valencia et al.

(10) Patent No.: US 11,255,603 B2
(45) Date of Patent: Feb. 22, 2022

(54) TREATMENT PLANT FOR HYDROCARBON GAS HAVING VARIABLE CONTAMINANT LEVELS

(71) Applicants: Jaime A. Valencia, Houston, TX (US); Robert D. Denton, Bellaire, TX (US); David W. Maher, Spring, TX (US)

(72) Inventors: Jaime A. Valencia, Houston, TX (US); Robert D. Denton, Bellaire, TX (US); David W. Maher, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 852 days.

(21) Appl. No.: 15/245,965

(22) Filed: Aug. 24, 2016

(65) Prior Publication Data

US 2017/0089638 A1    Mar. 30, 2017

Related U.S. Application Data

(60) Provisional application No. 62/232,149, filed on Sep. 24, 2015.

(51) Int. Cl.
F25J 3/02    (2006.01)

(52) U.S. Cl.
CPC ........... F25J 3/0233 (2013.01); F25J 3/0209 (2013.01); F25J 3/0266 (2013.01); F25J 3/0295 (2013.01);
(Continued)

(58) Field of Classification Search
CPC .......... F25J 3/067; F25J 3/0233; F25J 3/0266; F25J 3/0295; F25J 1/0269; F25J 1/027;
(Continued)

(56) References Cited

U.S. PATENT DOCUMENTS

| 2,621,216 A | 12/1952 | White |
| 2,843,219 A | 7/1958 | Habgood |

(Continued)

FOREIGN PATENT DOCUMENTS

| DE | 3 149 847 | 7/1983 |
| EP | 0 133 208 | 2/1985 |

(Continued)

OTHER PUBLICATIONS

Aaron, D. et al. (2005) "Separation of $CO_2$ from Flue Gas: A Review," *Separation Science and Technology*, 40, pp. 321-348.
(Continued)

*Primary Examiner* — John F Pettitt, III
(74) *Attorney, Agent, or Firm* — ExxonMobil Upstream Research Company—Law Department

(57) ABSTRACT

A method of designing, constructing, and operating a hydrocarbon gas treatment plant is disclosed. A target hydrocarbon production range for a hydrocarbon gas meeting a required product specification is established. A cryogenic distillation column is designed and constructed with a vapor capacity to meet the target hydrocarbon production range. A variable feed refrigeration system is incorporated to cool an inlet feed of the hydrocarbon gas. The variable feed refrigeration system is designed to handle the target hydrocarbon production range and a wide range of contaminant concentrations in the inlet feed. A variable bottoms heating system is incorporated to handle heating duties associated with the wide range of contaminant concentrations in the inlet feed. A variable bottoms pumping system is incorporated to handle liquid flows associated with the wide range of contaminant concentrations in the inlet feed.

18 Claims, 6 Drawing Sheets

(52) U.S. Cl.
CPC ........ *F25J 2200/02* (2013.01); *F25J 2200/30* (2013.01); *F25J 2200/74* (2013.01); *F25J 2205/04* (2013.01); *F25J 2205/20* (2013.01); *F25J 2210/06* (2013.01); *F25J 2220/66* (2013.01); *F25J 2235/60* (2013.01); *F25J 2270/12* (2013.01); *F25J 2280/40* (2013.01); *F25J 2290/40* (2013.01); *F25J 2290/50* (2013.01); *Y02C 20/40* (2020.08)

(58) Field of Classification Search
CPC ........ F25J 1/0271; F25J 1/0272; F25J 1/0274; F25J 2290/50; F25J 2220/66; Y02C 10/12
USPC .................................................. 62/617, 637
See application file for complete search history.

(56) References Cited

U.S. PATENT DOCUMENTS

| | | | |
|---|---|---|---|
| 2,863,527 A | 12/1958 | Herbert | |
| 2,960,837 A | 11/1960 | Swenson et al. | |
| 3,050,950 A | 8/1962 | Karwat et al. | |
| 3,109,726 A | 11/1963 | Karwat | |
| 3,349,571 A | 10/1967 | Nebgen | |
| 3,393,527 A | 7/1968 | Swensen et al. | |
| 3,400,512 A | 9/1968 | McKay | |
| 3,421,984 A | 1/1969 | Jensen et al. | |
| 3,683,634 A | 8/1972 | Streich | |
| 3,705,625 A | 12/1972 | Whitten et al. | |
| 3,767,766 A | 10/1973 | Tjoa et al. | |
| 3,824,080 A | 7/1974 | Smith et al. | |
| 3,840,437 A * | 10/1974 | Awan .................... | B01D 3/425 203/2 |
| 3,842,615 A | 10/1974 | Reigel et al. | |
| 3,848,427 A | 11/1974 | Loofbourow | |
| 3,895,101 A | 7/1975 | Tsuruta | |
| 3,929,635 A | 12/1975 | Buriks et al. | |
| 3,933,001 A | 1/1976 | Muska | |
| 4,129,626 A | 12/1978 | Mellbom | |
| 4,246,015 A | 1/1981 | Styring | |
| 4,270,937 A | 6/1981 | Adler | |
| 4,280,559 A | 7/1981 | Best | |
| 4,281,518 A | 8/1981 | Muller et al. | |
| 4,318,723 A | 3/1982 | Holmes et al. | |
| 4,319,964 A | 3/1982 | Katz et al. | |
| 4,336,233 A | 6/1982 | Appl et al. | |
| 4,344,485 A | 8/1982 | Butler | |
| 4,370,156 A | 1/1983 | Goddin et al. | |
| 4,382,912 A | 5/1983 | Madgavkar et al. | |
| 4,383,841 A | 5/1983 | Ryan et al. | |
| 4,405,585 A | 9/1983 | Sartori et al. | |
| 4,417,449 A | 11/1983 | Hegarty et al. | |
| 4,417,909 A | 11/1983 | Weltmer | |
| 4,421,535 A | 12/1983 | Mehra | |
| 4,441,900 A | 4/1984 | Swallow | |
| 4,444,577 A * | 4/1984 | Perez .................... | C07C 7/005 62/622 |
| 4,459,142 A | 7/1984 | Goddin | |
| 4,462,814 A | 7/1984 | Holmes et al. | |
| 4,466,946 A | 8/1984 | Goddin et al. | |
| 4,511,382 A | 4/1985 | Valencia et al. | |
| 4,512,782 A | 4/1985 | Bauer et al. | |
| 4,533,372 A | 8/1985 | Valencia et al. | |
| 4,551,158 A | 11/1985 | Wagner et al. | |
| 4,563,202 A | 1/1986 | Yao et al. | |
| 4,592,766 A | 6/1986 | Kumman et al. | |
| 4,602,477 A | 7/1986 | Lucadamo | |
| 4,609,388 A | 9/1986 | Adler et al. | |
| 4,636,334 A | 1/1987 | Skinner et al. | |
| 4,695,672 A | 9/1987 | Bunting | |
| 4,697,642 A | 10/1987 | Vogel | |
| 4,710,213 A | 12/1987 | Sapper et al. | |
| 4,717,408 A | 1/1988 | Hopewell | |
| 4,720,294 A | 1/1988 | Lucadamo et al. | |
| 4,747,858 A | 5/1988 | Gottier | |
| 4,761,167 A | 8/1988 | Nicholas et al. | |
| 4,762,543 A | 8/1988 | Pantermuehl et al. | |
| 4,769,054 A | 9/1988 | Steigman | |
| 4,822,393 A | 4/1989 | Markbreiter et al. | |
| 4,831,206 A | 5/1989 | Zarchy | |
| 4,923,493 A | 5/1990 | Valencia et al. | |
| 4,927,498 A | 5/1990 | Rushmere | |
| 4,935,043 A | 6/1990 | Blanc et al. | |
| 4,954,220 A | 9/1990 | Rushmere | |
| 4,972,676 A | 11/1990 | Sakai | |
| 4,976,849 A | 12/1990 | Soldati | |
| 5,011,521 A | 4/1991 | Gottier | |
| 5,062,270 A | 11/1991 | Haut et al. | |
| 5,120,338 A | 6/1992 | Potts et al. | |
| 5,137,550 A | 8/1992 | Hegarty et al. | |
| 5,152,927 A | 10/1992 | Rivers | |
| 5,233,837 A | 8/1993 | Callahan | |
| 5,240,472 A | 8/1993 | Sircar | |
| 5,247,087 A | 9/1993 | Rivers | |
| 5,265,428 A | 11/1993 | Valencia et al. | |
| 5,335,504 A | 8/1994 | Durr et al. | |
| 5,345,771 A | 9/1994 | Dinsmore | |
| 5,567,396 A | 10/1996 | Perry et al. | |
| 5,620,144 A | 4/1997 | Strock et al. | |
| 5,643,460 A | 7/1997 | Marble et al. | |
| 5,700,311 A | 12/1997 | Spencer | |
| 5,720,929 A | 2/1998 | Minkkinen et al. | |
| 5,819,555 A | 10/1998 | Engdahl | |
| 5,820,837 A | 10/1998 | Marjanovich et al. | |
| 5,899,274 A | 5/1999 | Frauenfeld et al. | |
| 5,956,971 A | 9/1999 | Cole et al. | |
| 5,964,985 A | 10/1999 | Wootten | |
| 5,983,663 A | 11/1999 | Sterner | |
| 6,053,007 A | 4/2000 | Victory et al. | |
| 6,053,484 A | 4/2000 | Fan et al. | |
| 6,082,133 A | 7/2000 | Barclay et al. | |
| 6,082,373 A | 7/2000 | Sakurai et al. | |
| 6,162,262 A | 12/2000 | Minkkinen et al. | |
| 6,223,557 B1 | 5/2001 | Cole | |
| 6,240,744 B1 | 6/2001 | Agrawal et al. | |
| 6,267,358 B1 | 7/2001 | Gohara et al. | |
| 6,270,557 B1 | 8/2001 | Millet et al. | |
| 6,274,112 B1 | 8/2001 | Moffett et al. | |
| 6,336,334 B1 | 1/2002 | Minkkinen et al. | |
| 6,374,634 B2 | 4/2002 | Gallarda et al. | |
| 6,401,486 B1 | 6/2002 | Lee et al. | |
| 6,416,729 B1 | 7/2002 | DeBerry et al. | |
| 6,442,969 B1 | 9/2002 | Rojey et al. | |
| 6,500,982 B1 | 12/2002 | Hale et al. | |
| 6,505,683 B2 | 1/2003 | Minkkinen et al. | |
| 6,516,631 B1 | 2/2003 | Trebble | |
| 6,517,801 B2 | 2/2003 | Watson et al. | |
| 6,539,747 B2 | 4/2003 | Minta et al. | |
| 6,565,629 B1 | 5/2003 | Hayashida et al. | |
| 6,605,138 B2 | 8/2003 | Frondorf | |
| 6,631,626 B1 | 10/2003 | Hahn | |
| 6,632,266 B2 | 10/2003 | Thomas et al. | |
| 6,662,872 B2 | 12/2003 | Gutek et al. | |
| 6,708,759 B2 | 3/2004 | Leaute et al. | |
| 6,711,914 B2 | 3/2004 | Lecomte | |
| 6,735,979 B2 | 5/2004 | Lecomte et al. | |
| 6,755,251 B2 | 6/2004 | Thomas et al. | |
| 6,755,965 B2 | 6/2004 | Pironti et al. | |
| 6,818,194 B2 | 11/2004 | DeBerry et al. | |
| 6,883,327 B2 | 4/2005 | Iijima et al. | |
| 6,946,017 B2 | 9/2005 | Leppin et al. | |
| 6,958,111 B2 | 10/2005 | Rust et al. | |
| 6,962,061 B2 | 11/2005 | Wilding et al. | |
| 7,001,490 B2 | 2/2006 | Wostbrock et al. | |
| 7,004,985 B2 | 2/2006 | Wallace et al. | |
| 7,066,986 B2 | 6/2006 | Haben et al. | |
| 7,073,348 B2 | 7/2006 | Clodic et al. | |
| 7,121,115 B2 | 10/2006 | Lemaire et al. | |
| 7,128,150 B2 | 10/2006 | Thomas et al. | |
| 7,128,276 B2 | 10/2006 | Nilsen et al. | |
| 7,152,431 B2 | 12/2006 | Amin et al. | |
| 7,211,128 B2 | 5/2007 | Thomas et al. | |
| 7,211,701 B2 | 5/2007 | Muller et al. | |
| 7,219,512 B1 | 5/2007 | Wilding et al. | |

(56) References Cited

U.S. PATENT DOCUMENTS

| | | | |
|---|---|---|---|
| 7,285,225 B2 | 10/2007 | Copeland et al. | |
| 7,325,415 B2 | 2/2008 | Amin et al. | |
| 7,424,808 B2 | 9/2008 | Mak | |
| 7,437,889 B2 | 10/2008 | Roberts et al. | |
| 7,442,231 B2 | 10/2008 | Landrum | |
| 7,442,233 B2 | 10/2008 | Mitariten | |
| 7,493,779 B2 | 2/2009 | Amin | |
| 7,536,873 B2 | 5/2009 | Nohlen | |
| 7,550,064 B2 | 6/2009 | Bassler et al. | |
| 7,575,624 B2 | 8/2009 | Cartwright et al. | |
| 7,597,746 B2 | 10/2009 | Mak et al. | |
| 7,635,408 B2 | 12/2009 | Mak et al. | |
| 7,637,984 B2 | 12/2009 | Adamopoulos | |
| 7,637,987 B2 | 12/2009 | Mak | |
| 7,641,717 B2 | 1/2010 | Gal | |
| 7,662,215 B2 | 2/2010 | Sparling et al. | |
| 7,691,239 B2 | 4/2010 | Kister et al. | |
| 7,722,289 B2 | 5/2010 | Leone et al. | |
| 7,729,976 B2 | 6/2010 | Hill et al. | |
| 7,770,872 B2 | 8/2010 | Delatour | |
| 7,795,483 B2 | 9/2010 | Kulprathipanja et al. | |
| 7,806,965 B2 | 10/2010 | Stinson | |
| 7,814,975 B2 | 10/2010 | Hagen et al. | |
| 7,879,135 B2 | 2/2011 | Ravikumar et al. | |
| 7,901,583 B2 | 3/2011 | McColl et al. | |
| 7,955,496 B2 | 6/2011 | Iqbal et al. | |
| 8,002,498 B2 | 8/2011 | Leone et al. | |
| 8,020,408 B2 | 9/2011 | Howard et al. | |
| 8,133,764 B2 | 3/2012 | Dirks et al. | |
| 8,136,799 B2 | 3/2012 | Griepsma | |
| 8,303,685 B2 | 11/2012 | Schubert et al. | |
| 8,308,849 B2 | 11/2012 | Gal | |
| 8,312,738 B2 | 11/2012 | Singh et al. | |
| 8,372,169 B2 | 2/2013 | Tsangaris et al. | |
| 8,381,544 B2 | 2/2013 | Coyle | |
| 8,388,832 B2 | 3/2013 | Moffett et al. | |
| 8,428,835 B2 | 4/2013 | Habert et al. | |
| 8,475,572 B2 | 7/2013 | Prast et al. | |
| 8,500,105 B2 | 8/2013 | Nieuwoudt | |
| 8,529,662 B2 | 9/2013 | Kelley et al. | |
| 2002/0174687 A1 | 11/2002 | Cai | |
| 2002/0189443 A1 | 12/2002 | McGuire | |
| 2003/0181772 A1 | 9/2003 | Meyer et al. | |
| 2006/0207946 A1 | 9/2006 | McColl et al. | |
| 2006/0239879 A1 | 10/2006 | Lallemand et al. | |
| 2007/0056317 A1 | 3/2007 | Amin et al. | |
| 2007/0125537 A1* | 6/2007 | Lokhandwala | C10L 3/10 166/291 |
| 2007/0144943 A1 | 6/2007 | Lemaire et al. | |
| 2007/0193303 A1* | 8/2007 | Hawrysz | F25J 1/0242 62/612 |
| 2007/0277674 A1 | 12/2007 | Hirano et al. | |
| 2008/0034789 A1 | 2/2008 | Fieler et al. | |
| 2008/0091316 A1 | 4/2008 | Szczublewski | |
| 2008/0092589 A1 | 4/2008 | Trainer et al. | |
| 2008/0307827 A1 | 12/2008 | Hino et al. | |
| 2009/0023605 A1 | 1/2009 | Lebl et al. | |
| 2009/0220406 A1 | 9/2009 | Rahman | |
| 2010/0011809 A1 | 1/2010 | Mak | |
| 2010/0018248 A1 | 1/2010 | Fieler et al. | |
| 2010/0024472 A1 | 2/2010 | Amin et al. | |
| 2010/0031699 A1* | 2/2010 | Dam | F25J 1/0292 62/613 |
| 2010/0064725 A1 | 3/2010 | Chieng et al. | |
| 2010/0107687 A1 | 5/2010 | Andrian et al. | |
| 2010/0132405 A1 | 6/2010 | Nilsen | |
| 2010/0147022 A1 | 6/2010 | Hart et al. | |
| 2010/0187181 A1 | 7/2010 | Sortwell | |
| 2010/0310439 A1 | 12/2010 | Brok et al. | |
| 2011/0132034 A1 | 6/2011 | Beaumont et al. | |
| 2011/0154856 A1 | 6/2011 | Andrian et al. | |
| 2011/0168019 A1 | 7/2011 | Northrop et al. | |
| 2011/0192190 A1 | 8/2011 | Andrian et al. | |
| 2011/0265512 A1 | 11/2011 | Bearden et al. | |
| 2012/0006055 A1 | 1/2012 | Van Santen et al. | |
| 2012/0031143 A1 | 2/2012 | Van Santem et al. | |
| 2012/0031144 A1 | 2/2012 | Northrop et al. | |
| 2012/0079852 A1 | 4/2012 | Northrop et al. | |
| 2012/0125043 A1 | 5/2012 | Cullinane et al. | |
| 2012/0204599 A1 | 8/2012 | Northrop et al. | |
| 2012/0279728 A1 | 11/2012 | Northrop et al. | |
| 2013/0032029 A1 | 2/2013 | Mak | |
| 2013/0074541 A1 | 3/2013 | Kaminsky et al. | |
| 2013/0098105 A1 | 4/2013 | Northrop | |
| 2014/0137599 A1 | 5/2014 | Oelfke et al. | |
| 2015/0158796 A1 | 6/2015 | Valencia et al. | |
| 2015/0159939 A1 | 6/2015 | Valencia et al. | |
| 2015/0159940 A1 | 6/2015 | Valencia et al. | |
| 2015/0159941 A1 | 6/2015 | Valencia et al. | |
| 2015/0159942 A1 | 6/2015 | Valencia et al. | |
| 2015/0159943 A1 | 6/2015 | Valencia et al. | |
| 2015/0159944 A1 | 6/2015 | Valencia et al. | |
| 2015/0159945 A1 | 6/2015 | Valencia et al. | |
| 2015/0159946 A1 | 6/2015 | Valencia et al. | |
| 2015/0159947 A1 | 6/2015 | Valencia et al. | |
| 2015/0300735 A1* | 10/2015 | Valencia | F25J 3/0266 62/637 |

FOREIGN PATENT DOCUMENTS

| | | |
|---|---|---|
| EP | 0 508 244 | 10/1992 |
| EP | 1 338 557 | 3/2005 |
| GB | 1010403 | 11/1965 |
| WO | WO 2002/032536 | 4/2002 |
| WO | WO 2002/039038 | 5/2002 |
| WO | WO 2004/047956 | 6/2004 |
| WO | WO 2008/034789 | 3/2008 |
| WO | WO 2008/095258 | 8/2008 |
| WO | WO 2008/152030 | 12/2008 |
| WO | WO 2009/023605 | 2/2009 |
| WO | WO 2009/029353 | 3/2009 |
| WO | WO 2009/087206 | 7/2009 |
| WO | WO 2010/023238 | 3/2010 |
| WO | WO 2010/052299 | 5/2010 |
| WO | WO 2010/136442 | 12/2010 |
| WO | WO 2011/026170 | 3/2011 |
| WO | WO 2013/095828 | 6/2013 |
| WO | WO 2013/142100 | 9/2013 |

OTHER PUBLICATIONS

Amin, R. (2003) "Advanced Mini Natural Gas Liquefier," *LNG Journal*, Mar.-Apr. 2003, pp. 20-23.

Black, S. (2006) "Chilled Ammonia Process for CO2 Capture," *Alstom Position Paper*, Nov. 2006, 6 pgs.

Ciulla, Vincent (2007) "How the Engine Works," About.com, Mar. 21, 2007, [retrieved from the internet on Aug. 17, 2012]. <URL: http://autorepair.about.com/cs/generalinfo/a/aa060500a.html>.

"Cryogenics" Science Clarified, May 2, 2006 [retrieved from the internet on Aug. 17, 2012]. <URL: http://www.scienceclarified.com/Co-Dl/Cryogenics.html>.

Denton, R. D. et al. (1985) "Integrated Low Temperature Processing of Sour Natural Gas," *Gas Processors Assoc., 64th th Ann. Conv.*, pp. 92-96.

Guccione, E. (1963) "New Approach to Recovery of Helium from Natural Gas," Chem. Engr., Sep. 30, 1963, pp. 76-78.

Hassan, S. M. N. (2005) "Techno-Economic Study of $CO_2$ Capture Process for Cement Plants," *University of Waterloo—Thesis*.

Haut, R. C. et al. (1988) "Development and Application of the Controlled Freeze Zone Process," *SPE 17757, SPE Gas Tech. Symp.*—Dallas, TX, pp. 435-443.

Haut, R. C. et al. (1988) "Development and Application of the Controlled Freeze Zone Process," *OSEA 88197, 7th Offshore So. East Asia Conf.*, Singapore, Feb. 1988, pp. 840-848.

Haut, R. C. et al. (1989) "Development and Application of the Controlled Freeze Zone Process," *SPE Production Engineering*, Aug. 1989, pp. 265-271.

Im, U. K. et al. (1971) "Heterogeneous Phase Behavior of Carbon Dioxide in n-Hexane and n-Heptane at Low Temperatures," *Jrnl. of Chem. Engineering Data*, v.16.4, pp. 412-415.

(56) References Cited

OTHER PUBLICATIONS

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conf.*, Feb. 25-27, 2007.

Northrop, P. Scott et al. (2004) "Cryogenic Sour Gas Process Attractive for Acid Gas Injection Applications," *83rd Ann. Gas Processors Assoc. Convention*, New Orleans, LA., pp. 1-8 (XP007912217).

Pagcatipunan, C. et al. (2005) "Maximize the Performance of Spray Nozzle Systems," *CEP Magazine*, Dec. 2005, pp. 38-44.

Reyes, S. C. et al. (1997) "Frequency Modulation Methods for Diffusion and Adsorption Measurements in Porous Solids," *J. Phys. Chem. B*, v.101, pp. 614-622.

Rubin, E. S. et al. (2002) "A Technical, Economic and Environmental Assessment of Amine-based CO2 Capture Technology for Power Plant Greenhouse Gas Control," *U.S. Dept. of Energy*, Oct. 2002, DOE/DE-FC26-00NT40935, 26 pages.

Spero, C. (2007) "Callide Oxyfuel Project," *CS Energy, cLET Seminar*, Jul. 12, 2007, 9 pages.

Thomas, E. R. et al. (1987) "Conceptual Studies Using the Controlled Freeze Zone (CFZ) Process," *AIChE Summer Nat'l Mtg.*, Aug. 16-19, 1987.

Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

Valencia, J. A. et al. (2008) "Controlled Freeze Zone™ Technology for Enabling Processing of High $CO_2$ and $H_2S$ Gas Reserves," SPE-IPTC 12708, Kuala Lumpur, IN, v.4.1, Jan. 2008, pp. 2358-2363.

Victory, D. J. et al. (1987) "The CFZ Process: Direct Methane-Carbon Dioxide Fractionation," *66th Ann. GPA Convention*, Mar. 16-18, Denver, CO.

Wilson, R.W. et al. (1968) "Helium: Its Extraction and Purification," *Journ. Petrol. Tech.*, v. 20, pp. 341-344.

\* cited by examiner

TREATMENT PLANT FOR HYDROCARBON GAS HAVING VARIABLE CONTAMINANT LEVELS

CROSS REFERENCE TO RELATED APPLICATIONS

This application claims the benefit of U.S. Provisional Application Ser. No. 62/232,149 filed Sep. 24, 2015, the entirety of which is incorporated by reference herein.

FIELD OF THE DISCLOSURE

The disclosure relates generally to the field of fluid separation. More specifically, the disclosure relates to the cryogenic separation of contaminants, such as acid gas, from a hydrocarbon.

BACKGROUND OF THE DISCLOSURE

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir oftentimes carries with it the incidental production of non-hydrocarbon gases. Such gases include contaminants, such as carbon dioxide ("$CO_2$"), hydrogen sulfide ("$H_2S$"), carbonyl sulfide, carbon disulfide, various mercaptans, and mixtures thereof. When a feed stream being produced from a reservoir includes these contaminants mixed with hydrocarbons, the stream is oftentimes referred to as "sour gas." The contaminants themselves are oftentimes referred to as "acid gas."

Many natural gas reservoirs have relatively low percentages of hydrocarbons and relatively high percentages of contaminants. Contaminants may act as a diluent and lower the heat content of hydrocarbons. Further, some contaminants, like sulfur-bearing compounds, can be noxious. Additionally, in the presence of water some contaminants can react to form corrosive compounds.

It is desirable to remove contaminants from a stream containing hydrocarbons to produce sweet and concentrated hydrocarbons. Specifications for pipeline quality natural gas typically call for a maximum of 2-4 mole % $CO_2$ and ¼ grain $H_2S$ per 100 scf (4 ppmv) or 5 mg/Nm3 $H_2S$. Specifications for lower temperature processes such as natural gas liquefaction plants or nitrogen rejection units typically require less than 50 ppm $CO_2$.

The separation of contaminants from hydrocarbons is difficult and consequently significant work has been applied to the development of hydrocarbon/contaminant separation methods. These methods can be placed into three general classes: absorption by solvents (physical, chemical, and hybrids), adsorption by solids, and distillation.

Separation by distillation of some mixtures can be relatively simple and, as such, is widely used in the natural gas industry. However, distillation of mixtures of natural gas hydrocarbons, such as those containing primarily methane, and one of the most common contaminants in natural gas, carbon dioxide, can present significant difficulties. Conventional distillation principles and conventional distillation equipment are predicated on the presence of only vapor and liquid phases throughout the distillation tower. However, the separation of $CO_2$ from methane by distillation involves temperature and pressure conditions that result in solidification of $CO_2$ if pipeline or better quality hydrocarbon product is desired. The required temperatures are cold temperatures typically referred to as cryogenic temperatures.

Certain cryogenic distillations can overcome the above mentioned difficulties. These cryogenic distillations provide the appropriate mechanism to handle the formation and subsequent melting of solids during the separation of solid-forming contaminants from hydrocarbons. The formation of solid contaminants in equilibrium with vapor-liquid mixtures of hydrocarbons and contaminants at particular conditions of temperature and pressure takes place in a freezing section.

One challenge is the increasing need to process gas from reservoirs having a high acid gas content. For example, some reservoirs may have greater than 10 mole %, or 15 mole %, or 20 mole % acid gas and up to 30 mole %, or 40 mole %, or 50 mole %, or 60 mole %, or 70% mole %, or 80 mole % acid gas. Some reservoirs may even have greater than 50 mole % acid gas. Conventional technologies and even certain cryogenic distillations may have difficulty processing such a high proportion of acid gas. The challenge is greatly accentuated when the proportion or fraction of acid gas in the feed gas increases over time. Processing increased contaminants may also impact the volume of processed natural gas.

Another challenge is that a gas processing plant may be required to process feed gas from more than one reservoir, where each of the reservoirs supplies a feed gas with different acid gas fractions. Therefore, a need exists for a gas processing plant that can accommodate a wide range of acid gas fractions in a feed gas with a minimum of plant re-design. Additionally, a need exists for a gas processing plant that can substantially maintain its output regardless of the amount of contaminants in the feed gas input to the plant.

SUMMARY

The present disclosure provides a method of treating, in a gas treatment plant, a feed gas stream comprising hydrocarbon gas and acid gas. The method includes: (a) measuring the acid gas concentration in the feed gas stream at a first time to determine a first acid gas fraction; (b) cooling and liquefying at least a portion of the feed gas stream in a first feed refrigeration unit; (c) separating the liquefied acid gas from the first portion of the feed gas stream to create a first vapor stream having a first composition; (d) separating from the first vapor stream, primarily by freezing, substantially all of the acid gas remaining in the first vapor stream to create a hydrocarbon gas stream; (e) melting the frozen acid gas; (f) removing the melted acid gas and the liquefied acid gas, which together form a bottoms stream; (g) removing the hydrocarbon gas stream; (h) measuring the acid gas concentration in the feed gas stream at a second time to determine a second acid gas fraction, and if the second acid gas fraction is substantially higher than the first acid gas fraction, treating the feed gas stream by (I) cooling and liquefying a first portion of the acid gas using the first feed refrigeration unit and cooling and liquefying at least a second portion of the acid gas stream in at least one additional feed refrigeration unit and (II) separating the liquefied acid gas from the second portion of the feed gas stream to create a second vapor stream having a second composition, wherein the second composition is substantially similar to the first composition; and (h) repeating steps (d)-(f).

Also described herein is a method of processing a feed gas stream comprising determining the concentration of carbon dioxide in the feed gas stream; directing the feed gas stream through a flow control valve, wherein the flow control valve is configured to separate the feed gas stream into one or more fractions depending on the concentration of carbon dioxide in the feed gas stream and the heat exchange capacity of the feed refrigeration units; directing each fraction of the feed gas stream through a separate feed refrigeration unit to produce cooled feed streams; and introducing the cooled feed streams into a cryogenic distillation column. In some embodiments, if the carbon dioxide concentration is less than a first threshold, the flow control valve is configured to direct the feed gas stream in a single fraction to a single feed refrigeration unit. In other embodiments, if the carbon dioxide concentration is greater than a first threshold but less than a second threshold, the flow control valve is configured to separate the feed gas stream into two fractions. In other embodiments, if the carbon dioxide concentration is greater than a first and a second threshold but less than a third threshold, the flow control valve is configured to separate the feed gas stream into three fractions. In other embodiments if the carbon dioxide concentration is greater than a first, second, and third threshold, the flow control valve may be configured to separate the feed gas stream into at least four fractions.

Also described herein are methods for treating a feed gas stream comprising hydrocarbons and carbon dioxide. In the method a system is provided that has a variable capacity feed refrigeration system, a cryogenic distillation system, a variable capacity bottoms pump capacity, and a variable capacity bottoms heat exchange capacity. As feed gas stream is introduced into the system the concentration of carbon dioxide in the feed gas stream is measured. The concentration of carbon dioxide is then used to determine the refrigeration capacity of the feed refrigeration system that is activated and used, where the refrigeration capacity needed is that which is needed to maintain the carbon dioxide concentration of the cooled vapor stream entering the cryogenic distillation system is maintained within a predetermine range, such as from 10-30 mole %, or from 15-25 mole %, or from 18-25 mole %, or from 20-25 mole %. For example, as the concentration of carbon dioxide in the feed gas stream is measured, the number of feed refrigeration units activated and used at any one time to cool the feed gas stream may vary, so long as the concentration of carbon dioxide in the vapor portion of the cooled feed gas stream that enters the cryogenic distillation system is maintained within the predetermined range. The bottoms pump capacity, i.e., the capacity of the pumps that pump the bottoms stream exiting from the cryogenic distillation tower, may also be varied depending on the concentration of carbon dioxide in the feed gas stream. Thus, as the concentration of carbon dioxide in the feed gas stream increases the capacity of the bottoms pumps will be varied to increase to pump the increased volume of the bottoms stream. Likewise, the capacity of the bottoms heat exchanger may be increased to handle increased heating duty of the reboiler streams being returned to the cryogenic distillation tower.

The present disclosure also provides a method of designing and constructing a hydrocarbon gas treatment plant. A target hydrocarbon production range is established for a hydrocarbon gas meeting a required product specification. A cryogenic distillation column is designed and constructed with a vapor capacity to meet the target hydrocarbon production range. An overhead refrigeration and separation system is designed and constructed with a vapor capacity to meet the target hydrocarbon production range. A variable feed refrigeration system is incorporated to cool an inlet feed of the hydrocarbon gas. The variable feed refrigeration system is designed to handle the target hydrocarbon production range and a wide range of contaminant concentrations in the inlet feed. A variable bottoms heating system is incorporated, which is capable of handling heating duties associated with the wide range of contaminant concentrations in the inlet feed. A variable bottoms pumping system is incorporated, which is capable of handling liquid flows associated with the wide range of contaminant concentrations in the inlet feed.

The present disclosure further provides a gas treatment system for treating feed gas including hydrocarbon gas and acid gas. The system includes a first refrigeration unit that, when activated, cools and liquefies part of the acid gas in a feed gas stream, wherein the feed gas stream has a first acid gas fraction. At least one additional feed refrigeration unit is incorporated into the system and activated with the first feed refrigeration unit only when the feed gas stream has a second acid gas fraction substantially higher than the first acid gas fraction. The at least one additional feed refrigeration unit cools and liquefies part of the acid gas in the feed gas stream only when the feed gas stream has a second acid gas fraction substantially higher than the first acid gas fraction. A separator separates the liquefied acid gas from the feed gas stream to create a vapor stream having a composition that is substantially constant regardless of how many of the first feed refrigeration unit and the at least one additional feed refrigeration units are activated. A cryogenic distillation column freezes substantially all of the acid gas remaining in the vapor stream to create a hydrocarbon gas stream and an amount of frozen acid gas. A bottoms stream heat exchanger heats a bottoms stream that includes the liquefied acid gas and the amount of frozen acid gas after it has been melted. At least one bottoms stream pump removes the melted acid gas and the liquefied acid gas, which together form a bottoms stream. The number of the at least one bottoms stream pumps is selected as a function of the first acid gas fraction or the second acid gas fraction.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
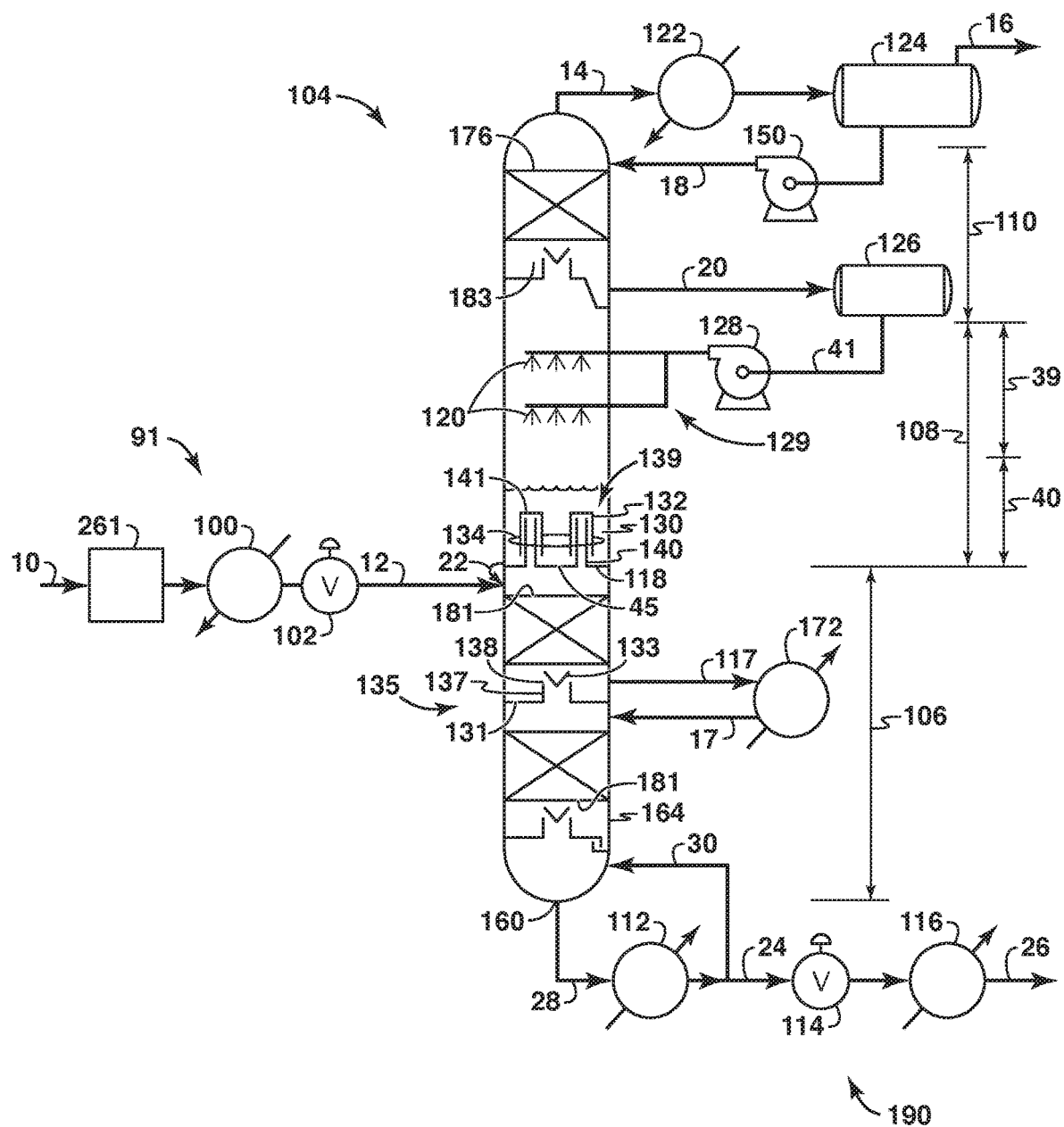
FIG. 1 is a schematic diagram of a distillation tower with sections within a single vessel.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The term "acid gas" and "sour gas" refers to any gas that dissolves in water to produce an acidic solution. Non-limiting examples of acid gases include hydrogen sulfide ($H_2S$), carbon dioxide ($CO_2$), sulfur dioxide ($SO_2$), and mixtures thereof. The term "trace sulfur compounds" includes carbon disulfide ($CS_2$), carbonyl sulfide (COS), mercaptans, and mixtures thereof. The term "acid gas injection" (AGI) refers to the disposal of an acid gas stream by increasing its pressure and introducing the pressurized stream into a subterranean reservoir.

The term "cryogenic" in the natural gas industry is used to refer to low temperature conditions, such as −40° Fahrenheit (−40° Celsius) or colder. The low temperature conditions are often those involved with propane refrigeration at atmospheric pressure or colder refrigerants. Cryogenic used in reference to a fluid means that the fluid is at a cryogenic temperature. Cryogenic used in reference to an item or material means that the item or material is suitable for operating at a cryogenic temperature and/or suitable for containing a cryogenic fluid. For example, a cryogenic vessel is a vessel that is suitable for containing a cryogenic fluid.

The term "cryogenic distillation" refers to a distillation process that is carried out at conditions involving cryogenic temperatures.

The term "Controlled Freeze Zone™ (CFZ™) process" refers to a process that takes advantage of the freezing potential of carbon dioxide ($CO_2$) in cryogenic distillation, rather than avoiding solidification of carbon dioxide. In the CFZ™ process, acid gas components are separated by cryogenic distillation through the controlled freezing and melting of carbon dioxide in a distillation column without the use of freeze-suppression additives. The CFZ™ process uses a cryogenic distillation column with an internal freezing section, a CFZ™ section, to handle the solidification and subsequent melting of $CO_2$ in a rather controlled fashion. The freezing section does not contain packing or typical trays like in conventional distillation columns. Instead, the freezing section contains one or more spray nozzles and a melt tray. In operation, solid $CO_2$ forms in the vapor space in the freezing section and falls into a liquid on the melt tray. Substantially all of the solids that form are confined to the freezing section. The portions of the distillation column above and below the freezing section of the column may be similar to conventional cryogenic demethanizer columns. For example, in the rectification section above the freezing section, methane ($CH_4$) is enriched to produce an overhead methane-rich stream, while the stripping section below the freezing section generates a liquid bottoms stream containing contaminants such as $CO_2$ and hydrogen sulfide ($H_2S$) with very little residual methane. The overhead methane-rich stream may be sold or further processed and the acid gas rich bottoms stream may be disposed as waste or further processed.

The term "heat exchanger" refers to a device designed to efficiently transfer or "exchange" heat from one matter to another. Exemplary heat exchanger types include a co-current or counter-current heat exchanger, an indirect heat exchanger (e.g., spiral wound heat exchanger, plate-fin heat exchanger such as a brazed aluminum plate fin type, shell-and-tube heat exchanger, etc.), direct contact heat exchanger, or some combination of these, and so on.

As referenced in this application, the terms "stream," "gas stream," "vapor stream," and "liquid stream" refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably.

Figure 7:
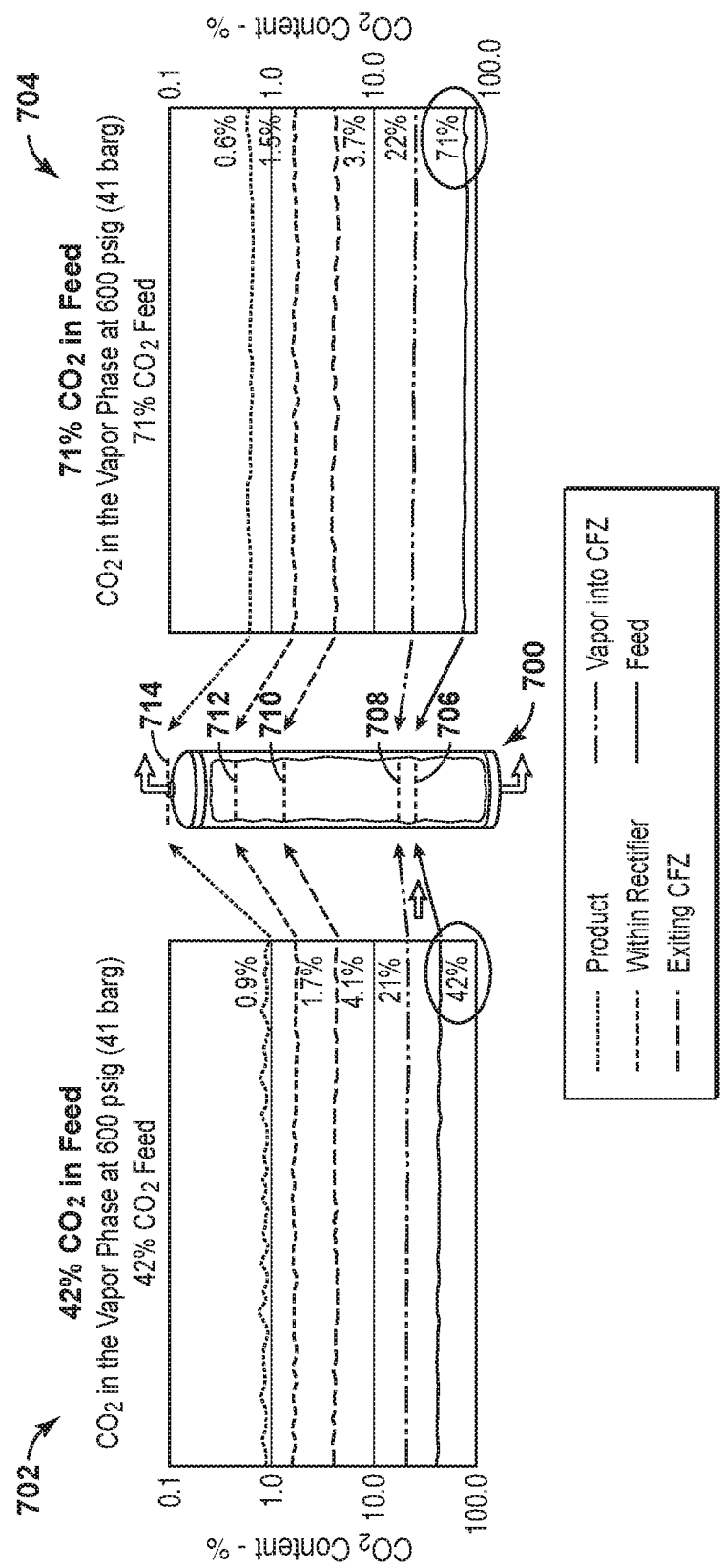
FIG. 7 is a chart illustrating the $CO_2$ profile of various vapor streams within a cryogenic distillation tower for feeds with different $CO_2$ contents.

A gas processing plant using the CFZ™ process was tested with feed gases having a $CO_2$ content ranging from 8 mole % to 71 mole %, and a $H_2S$ content ranging from 0 to 36 mole %. While reviewing the operational results of the CFZ plant, it was remarkable to observe the consistency of the $CO_2$ profiles in the vapor streams entering the CFZ section, progressing thru this section into the upper rectifying section of the tower, and exiting the tower overheads as a product. FIG. 7 illustrates such profiles, in which reference number 700 depicts a cryogenic distillation column using the CFZ™ process. Table 702 shows the $CO_2$ percentage at various positions in the cryogenic distillation column 700 when using a feed gas having a 42 mole % $CO_2$ content, and table 704 shows the $CO_2$ percentage at various positions in the cryogenic distillation column 700 when using a feed gas having a 71 mole % $CO_2$ content. Thus, for feed streams containing roughly 20 mole % $CO_2$ or more (at 706), the vapor entering the CFZ section (at 708) remained fairly constant at around 20 mole %. The CFZ section would further reduce the $CO_2$ content to typically the 3 to 5% range (at 710), depending on operating conditions, and the rectifier (at 712) would finish the purification to product specifications (at 714). Thus any $CO_2$ in the feed gas in excess of roughly 20 mole % was largely being condensed in the feed chillers. These observations led the inventors to several discoveries:

a) The most expensive parts of a cryogenic distillation section are those associated with the colder sections, e.g., the freezing section (i.e., CFZ section), rectifier section, and overhead reflux/refrigeration. The size of these colder sections is largely dictated by the lighter components which end up in the overhead product stream, namely methane, nitrogen, and helium, if any present, and which as vapors flow upwards thru the tower.

b) For a given overhead hydrocarbon (methane/natural gas) product target rate, the accompanying $CO_2$ impurities in the feed in excess of 20 mole % and up to 70+ mole % are condensed into a liquid phase that occupies much lower volumes, has less impact in dictating design limits of the distillation system, and can be easily accommodated in a design that follows other more critical parameters.

c) One single tower can have the flexibility to handle a wide range of feed contaminant levels for a given hydrocarbon (methane/natural gas) product target rate.

d) The flexibility in handling a wide range of feed contaminant levels may be accomplished by providing additional feed chilling capacity/refrigeration as the $CO_2$ concentration in the feed increases. To maintain a "standardization" concept, the increases in chilling capacity/refrigeration may be done in standard sizes or steps.

e) As additional liquids flow to the bottom of the stripper section with increases in the $CO_2$ content in the feed, the need may arise to pump additional amount of bottoms. Additional pumps therefore may be provided as the concentration of $CO_2$ increases in the feed. The pumps may also be standardized in size/capacity.

f) As additional liquids flow to the bottom of the stripper section with increases in the $CO_2$ content in the feed, the need may arise to provide additional reboiler heat to the tower to recover valuable light hydrocarbons. Additional reboiler heat exchangers therefore may be provided as the concentration of $CO_2$ increases in the feed. The reboilers may also be standardized in size/capacity.

g) The addition of feed refrigeration, bottoms pumps, and reboilers does not have to necessarily be in lockstep, rather each should be sized and optimized for its purposes.

Thus, as described herein, a single cryogenic distillation plant can be designed which is capable of processing and purifying hydrocarbon gas streams containing a wide range of contaminants including $CO_2$ and $H_2S$. Such a plant allows management of the uncertainty or variability in feed composition over the life of the plant, regardless of the source of uncertainty or variability, while maintaining a known hydrocarbon sales product rate. Thus, this disclosure relates to a system and method for the design and construction of a hydrocarbon gas treatment plant that is capable of processing feed streams containing a wide range of contaminant concentrations. FIGS. 1-6 of the disclosure display various aspects of the system and method.

The system and method may separate a raw gas feed stream comprising methane and various contaminants, such as carbon dioxide and hydrogen sulfide. The system may comprise a distillation tower 104, 204 (FIGS. 1-4). The distillation tower 104, 204 may separate contaminants from the methane. The distillation tower 104, 204 may be a cryogenic distillation column and, in exemplary embodiments, the distillation tower 104, 204 may be a cryogenic distillation column using the CFZ™ process.

The distillation tower 104, 204 may be separated into three functional sections: a lower section 106, a middle freezing section 108, which may be a CFZ™ section, and an upper section 110. The distillation tower 104, 204 may incorporate three functional sections when the upper section 110 is needed and/or desired.

The distillation tower 104, 204 may incorporate only two functional sections when the upper section 110 is not needed and/or desired. When the distillation tower does not include an upper section 110, a portion of vapor leaving the middle freezing section 108 may be condensed in a condenser 122 and returned as a liquid stream via a spray assembly 129. Moreover, lines 18 and 20 may be eliminated, elements 124 and 126 may be one and the same, and elements 150 and 128 may be one and the same. The stream in line 14, now taking the vapors leaving the middle controlled freeze section 108, directs these vapors to the condenser 122.

The lower section 106 may also be referred to as a stripper section. The middle freezing section 108 may also be referred to as a freezing section. The upper section 110 may also be referred to as a rectifier section.

Figure 3:
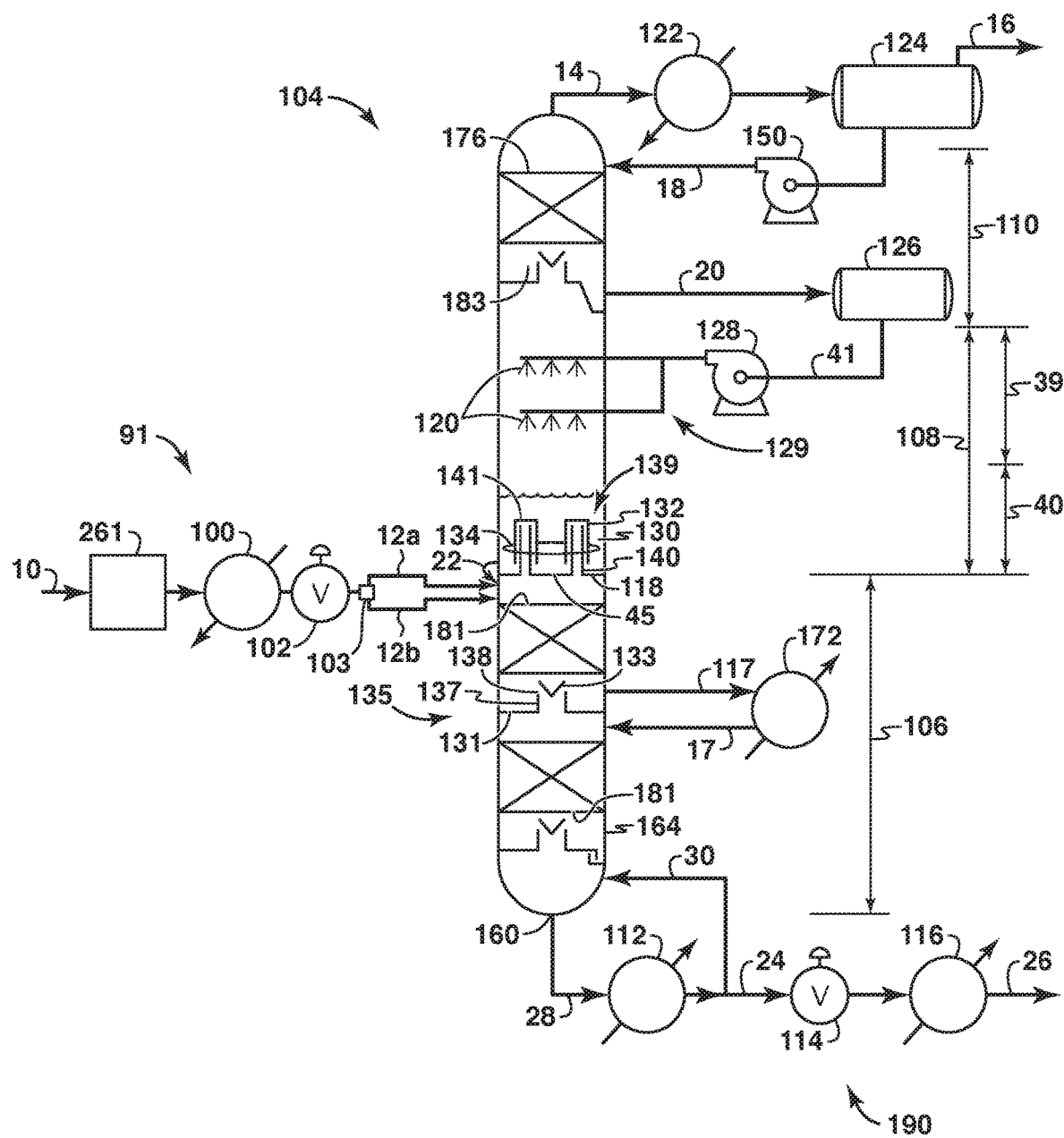
FIG. 3 is a schematic diagram of a distillation tower with a split feed stream and sections within a single vessel.

The sections of the distillation tower 104 may be housed within a single vessel (FIGS. 1 and 3). For example, the lower section 106, the middle freezing section 108, and the upper section 110 may be housed within a single vessel 164.

Figure 2:
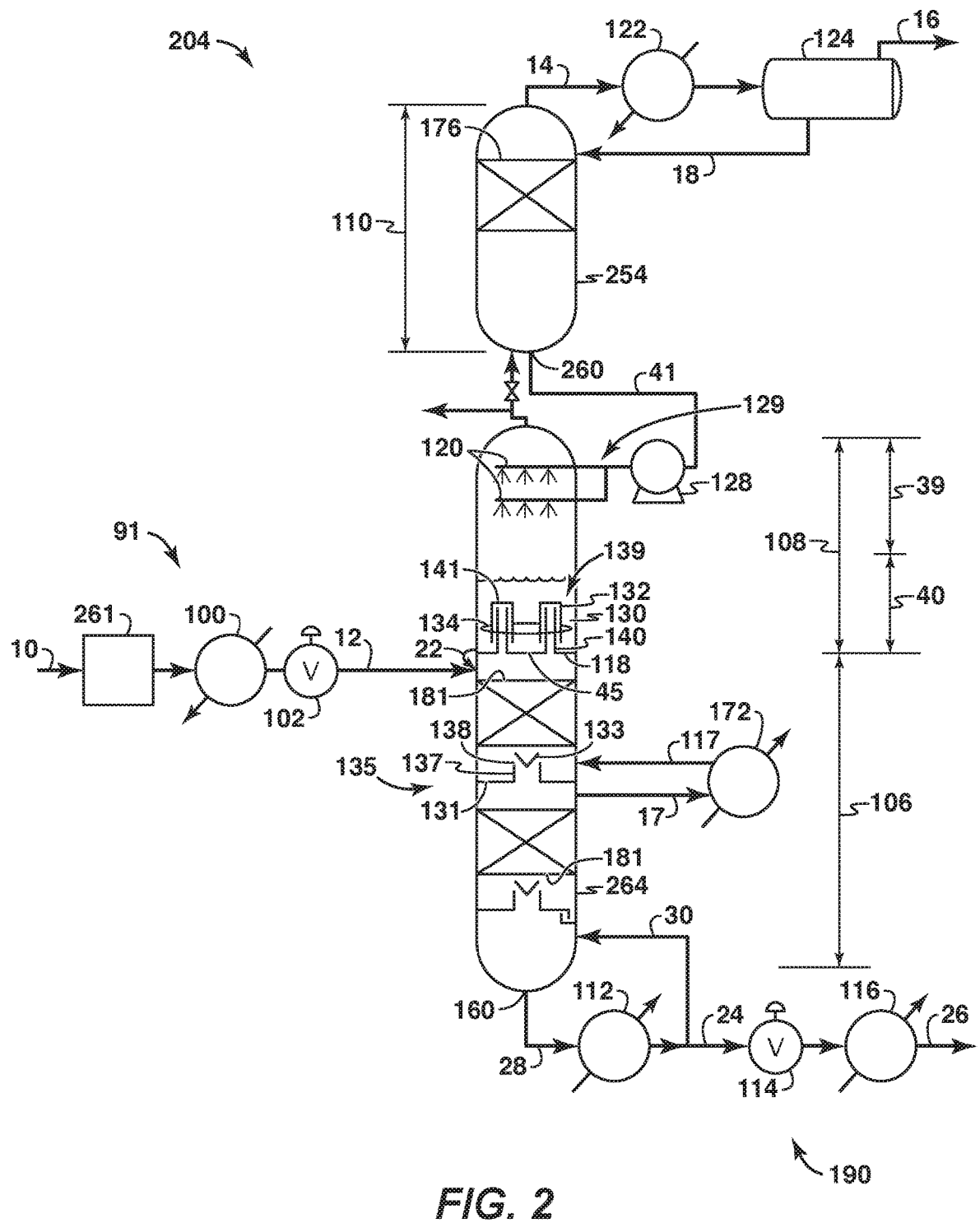
FIG. 2 is a schematic diagram of a distillation tower with sections within multiple vessels.
Figure 4:
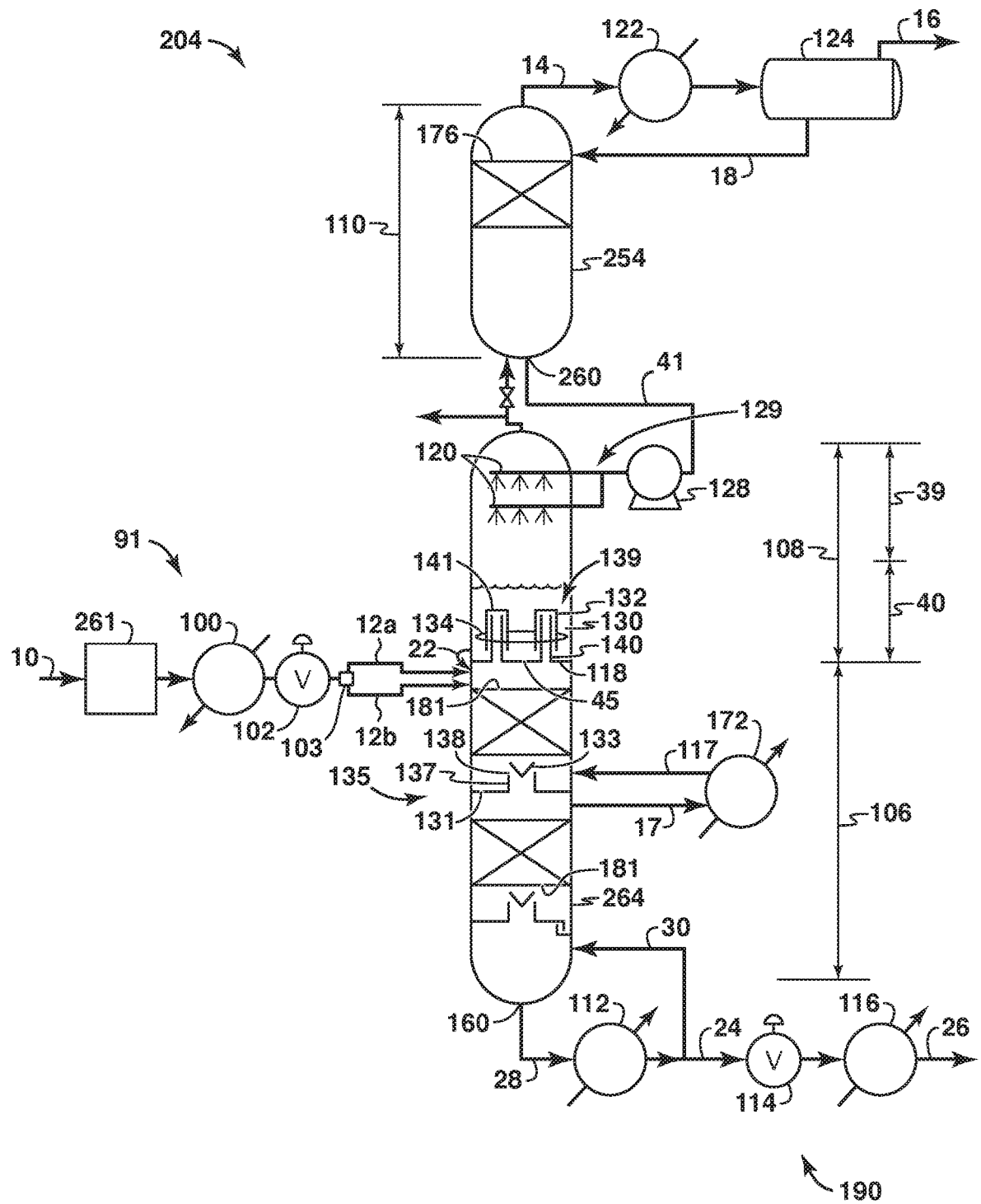
FIG. 4 is a schematic diagram of a distillation tower with a split feed stream and sections within multiple vessels.

The sections of the distillation tower 204 may be housed within a plurality of vessels to form a split-tower configuration (FIGS. 2 and 4). Each of the vessels may be separate from the other vessels. Piping and/or another suitable mechanism may connect one vessel to another vessel. In this instance, the lower section 106, middle freezing section 108, and upper section 110 may be housed within two or more vessels. For example, as shown in FIGS. 2 and 4, the upper section 110 may be housed within a single vessel 254 and the lower and middle freezing sections 106, 108 may be housed within a single vessel 264. When this is the case, a liquid stream exiting the upper section 110, may exit through a liquid outlet bottom 260. The liquid outlet bottom 260 is at the bottom of the upper section 110. Although not shown, each of the sections may be housed within its own separate vessel, or one or more section may be housed within separate vessels, or the upper and middle freezing sections may be housed within a single vessel and the lower section may be housed within a single vessel, etc. When sections of the distillation tower are housed within vessels, the vessels may be side-by-side along a horizontal line and/or above each other along a vertical line.

The split-tower configuration may be beneficial in situations where the height of the distillation tower, motion considerations, and/or transportation issues, such as for remote locations, need to be considered. This split-tower configuration allows for the independent operation of one or more sections. For example, when the upper section is housed within a single vessel and the lower and middle freezing sections are housed within a single vessel, independent generation of reflux liquids using a substantially contaminant-free, largely hydrocarbon stream from a packed gas pipeline or an adjacent hydrocarbon line, may occur in the upper section. And the reflux may be used to cool the upper section, establish an appropriate temperature profile in the upper section, and/or build up liquid inventory at the bottom of the upper section to serve as an initial source of spray liquids for the middle freezing section. Moreover, the middle freezing and lower sections may be independently prepared by chilling the feed stream, feeding it to the optimal location be that in the lower section or in the middle freezing section, generating liquids for the lower and the middle freezing sections, and disposing the vapors off the middle freezing section while they are off specification with too high a contaminant content. Also, liquid from the upper section may be intermittently or continuously sprayed, building up liquid level in the bottom of the middle freezing section and bringing the contaminant content in the middle freezing section down and near steady state level so that the two vessels may be connected to send the vapor stream from the middle freezing section to the upper section, continuously spraying liquid from the bottom of the upper section into the middle freezing section and stabilizing operations into steady state conditions. The split tower configuration may utilize a sump of the upper section as a liquid receiver for the pump 128, therefore obviating the need for a liquid receiver 126 in FIGS. 1 and 3.

The system may also include a pre-processing section 91 that processes the feed stream 10 to a suitable temperature, pressure, composition, and/or phase before entering the distillation tower 104, 204. The pre-processing section 91 may include a heat exchanger 100 (FIGS. 1-4). The feed stream 10 may enter the heat exchanger 100 before entering the distillation tower 104, 204. The feed stream 10 may be cooled within the heat exchanger 100. The heat exchanger 100 helps drop the temperature of the feed stream 10 to a level suitable for introduction into the distillation tower 104, 204.

The pre-processing section 91 may include an expander device 102 (FIGS. 1-4). The feed stream 10 may enter the expander device 102 before entering the distillation tower 104, 204. The feed stream 10 may be expanded in the expander device 102 after exiting the heat exchanger 100. The expander device 102 helps drop the temperature of the feed stream 10 to a level suitable for introduction into the distillation tower 104, 204. The expander device 102 may be any suitable device, such as a valve. If the expander device 102 is a valve, the valve may be any suitable valve that may aid in cooling the feed stream 10 before it enters the distillation tower 104, 204. For example, the valve 102 may comprise a Joule-Thompson (J-T) valve.

The pre-processing section 91 may include a feed separator 103 (FIGS. 3-4). The feed stream may enter the feed separator before entering the distillation tower 104, 204. The feed separator 103 may separate a feed stream having a mixed liquid and vapor stream into a liquid stream and a vapor stream. An upper line 12a and a lower line 12b may extend from the feed separator 103 to the distillation tower 104, 204. Upper line 12a may receive the vapor stream from the feed separator 103. Lower line 12b may receive the liquid stream from the feed separator 103. Each of the lines 12a, 12b may extend to the same and/or different sections (i.e. middle freezing, and lower sections) of the distillation tower 104, 204. The expander device 102 may or may not be downstream of the feed separator 103. The expander device 102 may comprise a plurality of expander devices 102 such that each of upper and lower lines 12a, 12b has an expander device 102.

The pre-processing section 91 may include a dehydration unit 261 (FIGS. 1-4). The feed stream 10 may enter the dehydration unit 261 before entering the distillation tower 104, 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator 103, or distillation tower 104, 204. The water can present a problem by forming a separate water phase (i.e., ice and/or hydrate) that plugs lines, equipment or negatively affects the distillation process. The dehydration unit 261 dehydrates the feed stream to a dew point sufficiently low to ensure a separate water phase will not form at any point downstream during the rest of the process. The dehydration unit may be any suitable dehydration mechanism, such as a molecular sieve or a glycol dehydration unit.

The pre-processing section 91 may include a filtering unit (not shown). The feed stream 10 may enter the filtering unit before entering the distillation tower 104, 204. The filtering unit may remove undesirable contaminants from the feed stream before the feed stream enters the distillation tower 104, 204. Depending on what contaminants are to be removed, the filtering unit may be before or after the dehydration unit 261 and/or before or after the heat exchanger 100.

The pre-processing section 91 may include a line 12 (FIGS. 1-2) or lines 12a, 12b (FIGS. 3-4), collectively referred to herein as line 12. The line 12 may also be referred to as an inlet channel 12. The feed stream 10 may be introduced into the distillation tower 104, 204 through the line 12. The line 12 may extend to one or more of the lower section 106 or the middle freezing section 108 of the distillation tower 104, 204. For example, the line 12 may extend to the lower section 106 such that the feed stream 10 may enter the lower section 106 of the distillation tower 104, 204 (FIGS. 1-4). The line 12 may directly or indirectly extend to the lower section 106 or the middle freezing section 108. The line 12 may extend to an outer surface of the distillation tower 104, 204 before entering the distillation tower 104, 204.

If the pre-processing section 91 includes the feed separator 103 (FIGS. 3-4), the line 12 may comprise a plurality of lines, which may include upper and lower lines 12a, 12b. Each line may be the same line as one of the lines that extends from the feed separator to a specific portion of the distillation tower 104, 204.

The lower section 106 is constructed and arranged to separate the feed stream 10 into an enriched contaminant bottom liquid stream (i.e., liquid stream) and a freezing zone vapor stream (i.e., vapor stream). The lower section 106 separates the feed stream at a temperature and pressure at which no solids form. The liquid stream may comprise a greater quantity of contaminants than of methane. The vapor stream may comprise a greater quantity of methane than of contaminants. In any case, the vapor stream is lighter than the liquid stream. As a result, the vapor stream rises from the lower section 106 and the liquid stream falls to the bottom of the lower section 106.

The lower section 106 may include and/or connect to equipment that separates the feed stream. The equipment may comprise any suitable equipment for separating methane from contaminants, such as one or more packed sections 181, or one or more distillation trays with perforations, downcomers, and weirs (FIGS. 1-4).

The equipment may include components that apply heat to the stream to form the vapor stream and the liquid stream.

For example, the equipment may comprise a first reboiler 112 that applies heat to the stream. The first reboiler 112 may be located outside of the distillation tower 104, 204. The equipment may also comprise a second reboiler 172 that applies heat to the stream. The second reboiler 172 may be located outside of the distillation tower 104, 204. Line 117 may lead from the distillation tower to the second reboiler 172. Line 17 may lead from the second reboiler 172 to the distillation tower. Additional reboilers, set up similarly to the second reboiler described above, may also be used.

The first reboiler 112 may apply heat to the liquid stream that exits the lower section 106 through a liquid outlet 160 of the lower section 106. The liquid stream may travel from the liquid outlet 160 through line 28 to reach the first reboiler 112 (FIGS. 1-4). The amount of heat applied to the liquid stream by the first reboiler 112 can be increased to separate more methane from contaminants. The more heat applied by the reboiler 112 to the stream, the more methane separated from the liquid contaminants, though more contaminants will also be vaporized.

The first reboiler 112 may also apply heat to the stream within the distillation tower 104, 204. Specifically, the heat applied by the first reboiler 112 warms up the lower section 106. This heat travels up the lower section 106 and supplies heat to warm solids entering a melt tray assembly 139 (FIGS. 1-4) of the middle freezing section 108 so that the solids form a liquid and/or slurry mix.

The second reboiler 172 applies heat to the stream within the lower section 106. This heat is applied closer to the middle freezing section 108 than the heat applied by the first reboiler 112. As a result, the heat applied by the second reboiler 172 reaches the middle freezing section 108 faster than the heat applied by the first reboiler 112. The second reboiler 172 also helps with energy integration.

The equipment may include one or more chimney assemblies 135 (FIGS. 1-4). While falling to the bottom of the lower section 106, the liquid stream may encounter one or more of the chimney assemblies 135.

Each chimney assembly 135 includes a chimney tray 131 that collects the liquid stream within the lower section 106. The liquid stream that collects on the chimney tray 131 may be fed to the second reboiler 172. After the liquid stream is heated in the second reboiler 172, the stream may return to the middle of lower section 106 to supply heat to the middle of lower section 106 and/or the melt tray assembly 139. Unvaporized stream exiting the second reboiler 172 may be fed back to the distillation tower 104, 204 below the chimney tray 131. Vapor stream exiting the second reboiler 172 may be routed under or above the chimney tray 131 when the vapor stream enters the distillation tower 104, 204.

The chimney tray 131 may include one or more chimneys 137. The chimney 137 serves as a channel that the vapor stream in the lower section 106 traverses. The vapor stream travels through an opening in the chimney tray 131 at the bottom of the chimney 137 to the top of the chimney 137. The opening is closer to the bottom of the lower section 106 than it is to the bottom of the middle freezing section 108. The top is closer to the bottom of the middle freezing section 108 than it is to the bottom of the lower section 106.

Each chimney 137 has attached to it a chimney cap 133. The chimney cap 133 covers a chimney top opening 138 of the chimney 137. The chimney cap 133 prevents the liquid stream from entering the chimney 137. The vapor stream exits the chimney assembly 135 via the chimney top opening 138.

After flowing to the bottom of the lower section 106, the liquid stream exits the distillation tower 104, 204 through the liquid outlet 160. The liquid outlet 160 is within the lower section 106 (FIGS. 1-4). The liquid outlet 160 may be located at the bottom of the lower section 106. The liquid outlet 160 may permit the liquid stream to pass into a liquids processing section 190.

After exiting through the liquid outlet 160, the feed stream may travel via line 28 to the first reboiler 112, which may be considered part of the liquids processing section 190. The feed stream may be heated by the first reboiler 112 and vapor may then re-enter the lower section 106 through line 30. Unvaporized liquid may continue out of the distillation process via line 24.

The liquids processing section 190 may include an expander device 114 (FIGS. 1-4). After entering line 24, the heated liquid stream may be expanded in the expander device 114. The expander device 114 may be any suitable device, such as a valve. The valve 114 may be any suitable valve, such as a J-T valve.

The liquids processing section 190 may include a heat exchanger 116 (FIGS. 1-4). The liquid stream heated by the first reboiler 112 may be cooled or heated by the heat exchanger 116. The heat exchanger 116 may be a direct heat exchanger or an indirect heat exchanger. The heat exchanger 116 may comprise any suitable heat exchanger.

The vapor stream in the lower section 106 rises from the lower section 106 to the middle freezing section 108. The middle freezing section 108 is maintained to receive a freezing zone liquid stream to form the solid and the vapor stream (i.e., hydrocarbon-enriched vapor stream) in the middle freezing section 108. The middle freezing section 108 is constructed and arranged to separate the feed stream 10 introduced into the middle freezing section into a solid and a vapor stream. The solid and the vapor stream are formed in the middle freezing section 108 when the freezing zone liquid stream is injected into the middle freezing section 108 at a temperature and pressure at which the solid and vapor stream form. The solid may be comprised more of contaminants than of methane. The vapor stream may comprise more methane than contaminants.

The middle freezing section 108 includes a lower section 40 and an upper section 39. The lower section 40 is below the upper section 39. The lower section 40 directly abuts the upper section 39. The lower section 40 is primarily but may not exclusively be a heating section of the middle freezing section 108. The upper section 39 is primarily but may not exclusively be a cooling section of the middle freezing section 108. The temperature and pressure of the upper section 39 are chosen so that the solid can form in the middle freezing section 108.

The middle freezing section 108 may comprise a melt tray assembly 139 that is maintained in the middle freezing section 108 (FIGS. 1-4). The melt tray assembly 139 is within the lower section 40 of the middle freezing section 108. The melt tray assembly 139 is not within the upper section 39 of the middle freezing section 108.

The melt tray assembly 139 is constructed and arranged to melt a solid formed in the middle freezing section 108. When the warm vapor stream rises from the lower section 106 to the middle freezing section 108, the vapor stream immediately encounters the melt tray assembly 139 and supplies heat to melt the solid. The melt tray assembly 139 may comprise at least one of a melt tray 118, a bubble cap 132, a liquid 130 and heat mechanism(s) 134.

The melt tray 118 may collect a liquid and/or slurry mix. The melt tray 118 divides at least a portion of the middle freezing section 108 from the lower section 106. The melt tray 118 is at the bottom 45 of the middle freezing section 108.

One or more bubble caps 132 may act as a channel for the vapor stream rising from the lower section 106 to the middle freezing section 108. The bubble cap 132 may provide a path for the vapor stream that forces the vapor stream up the riser 140 and then down and around the riser 140 to the melt tray 118. The riser 140 is covered by a cap 141. The cap 140 prevents the liquid 130 from travelling into the riser 140. The cap 141 helps prevent solids from travelling into the riser 140. The vapor stream's traversal through the bubble cap 132 allows the vapor stream to transfer heat to the liquid 130 within the melt tray assembly 139.

One or more heat mechanisms 134 may further heat up the liquid 130 to facilitate melting of the solids into a liquid and/or slurry mix. The heat mechanism(s) 134 may be located anywhere within the melt tray assembly 139. For example, as shown in FIGS. 1-4, a heat mechanism 134 may be located around the bubble caps 132. The heat mechanism 134 may be any suitable mechanism, such as a heat coil. The heat source of the heat mechanism 134 may be any suitable heat source.

The liquid 130 in the melt tray assembly is heated by the vapor stream. The liquid 130 may also be heated by the one or more heat mechanisms 134. The liquid 130 helps melt the solids formed in the middle freezing section 108 into a liquid and/or slurry mix. Specifically, the heat transferred by the vapor stream heats up the liquid, thereby providing the heat to melt the solids. The liquid 130 is at a level sufficient to melt the solids.

The middle freezing section 108 may also comprise a spray assembly 129. The spray assembly 129 cools the vapor stream that rises from the lower section 40. The spray assembly 129 sprays liquid, which is cooler than the vapor stream, on the vapor stream to cool the vapor stream. The spray assembly 129 is within the upper section 39. The spray assembly 129 is not within the lower section 40. The spray assembly 129 is above the melt tray assembly 139. In other words, the melt tray assembly 139 is below the spray assembly 129.

The temperature in the middle freezing section 108 cools down as the vapor stream travels from the bottom of the middle freezing section 108 to the top of the middle freezing section 108. The methane in the vapor stream rises from the middle freezing section 108 to the upper section 110. Some contaminants may remain in the methane and also rise. The contaminants in the vapor stream tend to condense or solidify with the colder temperatures and fall to the bottom of the middle freezing section 108.

The solids form the liquid and/or slurry mix when in the liquid 130. The liquid and/or slurry mix flows from the middle freezing section 108 to the lower distillation section 106. The liquid and/or slurry mix flows from the bottom of the middle freezing section 108 to the top of the lower section 106 via a line 22 (FIGS. 1-4). The line 22 may be an exterior line. The line 22 may extend from the distillation tower 104, 204. The line 22 may extend from the middle freezing section 108. The line may extend to the lower section 106.

The vapor stream that rises in the middle freezing section 108 and does not form solids or otherwise fall to the bottom of the middle freezing section 108, rises to the upper section 110. The upper section 110 operates at a temperature and pressure and contaminant concentration at which no solid forms. The upper section 110 is constructed and arranged to cool the vapor stream to separate the methane from the contaminants. Reflux in the upper section 110 cools the vapor stream. The reflux is introduced into the upper section 110 via line 18. Line 18 may extend to the upper section 110. Line 18 may extend from an outer surface of the distillation tower 104, 204.

After contacting the reflux in the upper section 110, the feed stream forms a vapor stream and a liquid stream. The vapor stream mainly comprises methane. The liquid stream comprises relatively more contaminants. The vapor stream rises in the upper section 110 and the liquid falls to a bottom of the upper section 110.

To facilitate separation of the methane from the contaminants when the stream contacts the reflux, the upper section 110 may include one or more mass transfer devices 176. Each mass transfer device 176 helps separate the methane from the contaminants. Each mass transfer device 176 may comprise any suitable separation device, such as a tray with perforations, or a section of random or structured packing 176 to facilitate contact of the vapor and liquid phases.

After rising, the vapor stream may exit the distillation tower 104, 204 through line 14. The line 14 may emanate from an upper part of the upper section 110. The line 14 may extend from an outer surface of the upper section 110.

From line 14, the vapor stream may enter a condenser 122. The condenser 122 cools the vapor stream to form a cooled stream. The condenser 122 at least partially condenses the stream.

After exiting the condenser 122, the cooled stream may enter a separator 124. The separator 124 separates the vapor stream into liquid and vapor streams. The separator may be any suitable separator that can separate a stream into liquid and vapor streams, such as a reflux drum.

Once separated, the vapor stream may exit the separator 124 as sales product. The sales product may travel through line 16 for subsequent sale to a pipeline and/or condensation to be liquefied natural gas.

Once separated, the liquid stream may return to the upper section 110 through line 18 as the reflux. The reflux may travel to the upper section 110 via any suitable mechanism, such as a reflux pump 150 (FIGS. 1 and 3) or gravity (FIGS. 2 and 4).

The liquid stream (i.e., freezing zone liquid stream) that falls to the bottom of the upper section 110 collects at the bottom of the upper section 110. The liquid may collect on tray 183 (FIGS. 1 and 3) or at the bottommost portion of the upper section 110 (FIGS. 2 and 4). The collected liquid may exit the distillation tower 104, 204 through line 20 (FIGS. 1 and 3) or outlet 260 (FIGS. 2 and 4). The line 20 may emanate from the upper section 110. The line 20 may emanate from a bottom end of the upper section 110. The line 20 may extend from an outer surface of the upper section 110.

The line 20 and/or outlet 260 connect to a line 41. The line 41 leads to the spray assembly 129 in the middle freezing section 108. The line 41 emanates from the holding vessel 126. The line 41 may extend to an outer surface of the middle freezing section 110.

The line 20 and/or outlet 260 may directly or indirectly (FIGS. 1-4) connect to the line 41. When the line 20 and/or outlet 260 directly connect to the line 41, the liquid spray may be pumped to the spray nozzle(s) 120 via any suitable mechanism, such as the spray pump 128 or gravity. When the line 20 and/or outlet 260 indirectly connect to the line 41, the lines 20, 41 and/or outlet 260 and line 41 may directly connect to a holding vessel 126 (FIGS. 1 and 3). The holding vessel 126 may house at least some of the liquid spray before it is sprayed by the nozzle(s). The liquid spray may be pumped from the holding vessel 126 to the spray nozzle(s) 120 via any suitable mechanism, such as the spray pump 128 (FIGS. 1-4) or gravity. The holding vessel 126 may be needed when there is not a sufficient amount of liquid stream at the bottom of the upper section 110 to feed the spray nozzles 120.

Figure 5:
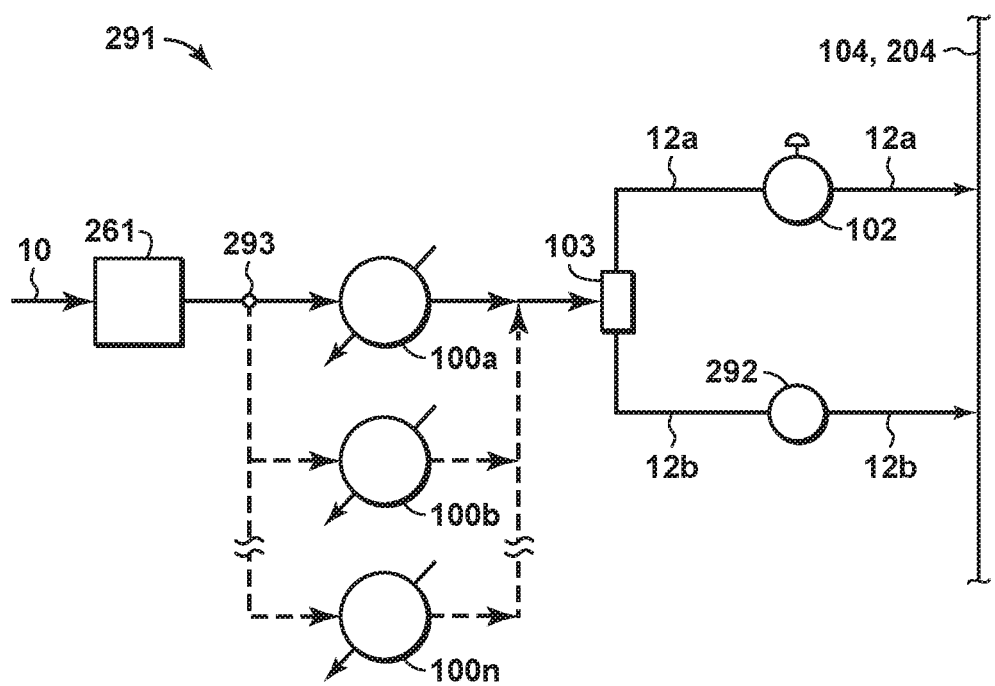
FIG. 5 is a schematic diagram of pre-processing for a feed stream of a distillation tower.
Figure 6:
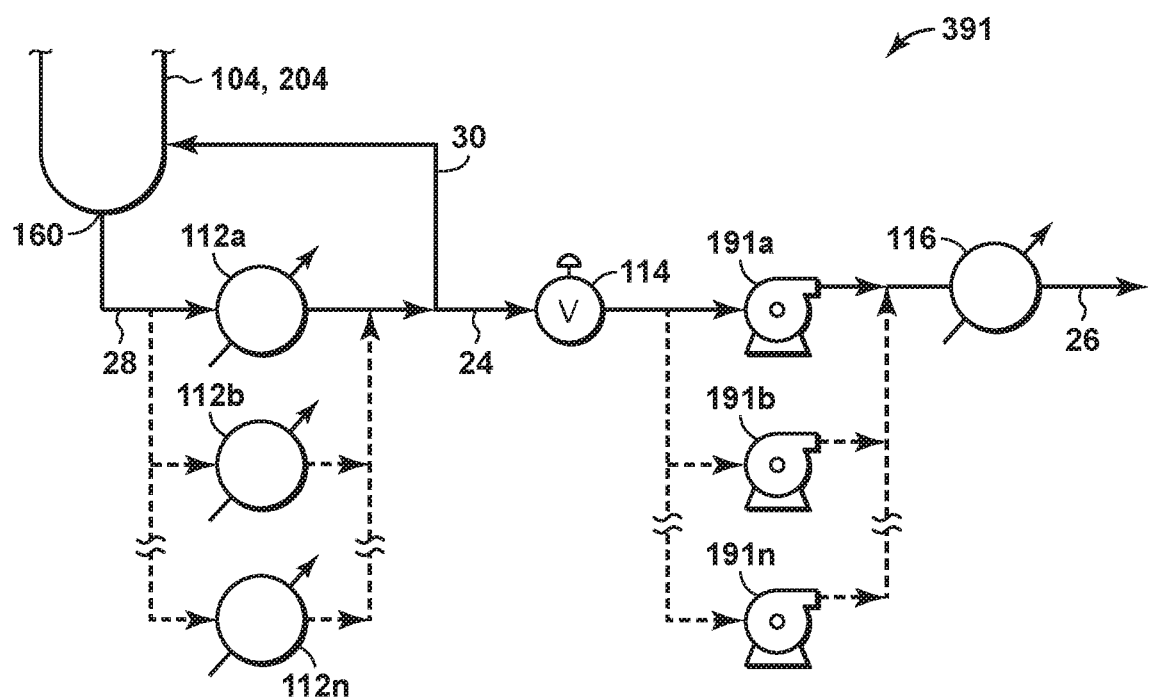
FIG. 6 is a liquids processing portion of a distillation tower.

FIGS. 5 and 6 show portions of the system according to other aspects of the disclosure. FIG. 5 depicts a pre-processing section 291 that may be used with any of the distillation towers 104, 204. Like pre-processing section 91, the pre-processing section 291 may include a dehydration unit 261 and a filtering unit (not shown). Pre-processing section 291 may include at least one feed refrigeration unit.

In general a refrigeration unit is a mechanical system that provides cooling by changing the phases of its refrigerant fluid in a vapor compression cycle. Thus, typical refrigeration units comprise a refrigerant fluid that provides desired cooling by evaporating at a cold temperature and relatively low pressure. The resulting low pressure refrigerant vapor is then compressed to a higher pressure at which it can be condensed to a warmer temperature. The condensed, high pressure, refrigerant is then cooled by a drop in pressure via an expansion device, such as a Joule-Thomson valve. The cold, low pressure liquid refrigerant is then ready to start the cycle again by providing refrigeration, cooling the desired process fluid in a chiller/heat exchanger, while evaporating again.

Thus, each feed refrigeration unit in the present application accomplishes the activity of a refrigeration unit in that it provides means for cooling and compressing. For example, in some embodiments a feed refrigeration unit may comprise a heat exchanger and a single compressor. However, in other embodiments, a feed refrigeration unit may comprise a heat exchanger and multiple compressors. Alternatively, a feed refrigeration unit may be sized by altering the temperature of the refrigerant fluid to provide for more heat transfer or by increasing the flow of the refrigerant fluid to the refrigeration unit. As such, the number and size of the feed refrigeration units can provide for variable capacity and flexibility in heat capacity sizing, and thus be able to be used to cool and liquefy feed streams containing a wide range of contaminant concentrations.

100*a*, 100*b*, 100*n*. A flow control valve 293 is configured to direct the flow of the feed stream to the at least one feed refrigeration unit 100*a-n*. The feed stream 10 may be cooled within the at least one feed refrigeration unit 100*a-n*. Each of the feed refrigeration units 100*a-n* helps drop the temperature of the feed stream 10 to a level suitable for introduction into the distillation tower 104, 204. In an aspect, any number of feed refrigeration units may be employed with the system, and this is expressed by the use of the suffix 'n' when referring to feed refrigeration unit 100*n*. In another aspect, the feed refrigeration units may have standardized or substantially similar performance characteristics, such as cooling capacity or a power rating of the source of refrigeration.

The number of feed refrigeration units 100*a-n* used depends on the amount of acid gas (e.g., carbon dioxide, hydrogen sulfide) in the feed stream 10. As a non-limiting example, if four feed refrigeration units with substantially similar performance characteristics are used, the following feed refrigeration unit deployment strategy may be implemented:

(a) one feed refrigeration unit 100*a* is used when the acid gas fraction of the feed stream is less than a first threshold. For example, the first threshold may be when the acid gas concentration in the feed stream is less than 40 mole %, or less than 35 mole %, or less than 32 mole %, or less than 30 mole %. For example, the first threshold may be when the acid gas concentration is in the range of 20-40 mole %, or 25-35 mole %, or 28-32 mole %;

(b) two feed refrigeration units 100*a*, 100*b* are used when the acid gas fraction of the feed stream is greater than the first threshold but less than a second threshold. For example, the second threshold may be when the acid gas concentration in the feed stream is greater than the first threshold and is less than 58 mole %, or less than 55 mole %, or less than 52 mole %, or less than 50 mole %. For example, the second threshold may be when the acid gas concentration is in the range of 42-58 mole %, or 45-55 mole %, or 48-52 mole %;

(c) three feed refrigeration units (100*a*, 100*b*, and a third feed refrigeration unit 100*n*) are used when the acid gas fraction of the feed stream is greater than the second but less than a third threshold. For example, the third threshold may be when the acid gas concentration in the feed stream is greater than the second threshold and is less than 67 mole %, or less than 65 mole %, or less than 63 mole %, or less than 60 mole %. For example the third threshold may be when the acid gas concentration is in the range of 52-67 mole %, or 57-63 mole %; and (d) four feed refrigeration units (100*a*, 100*b*, the third feed refrigeration unit (not shown), and 100*n*) are used when the acid gas fraction of the feed stream is greater than the third threshold but less than a fourth threshold. For example, the fourth threshold may be when the acid gas concentration in the feed stream is greater than the third threshold but less than 78 mole %, or less than 76 mole %, or less than 72 mole %, or less than 71 mole %, or less than 70 mole %. For example, the fourth threshold may be when the acid gas concentration is in the range of 68-72 mole %, or 69-71 mole %.

This feed refrigeration unit deployment strategy may also be implemented in reverse. That is, the cryogenic distillation system may be constructed with multiple feed refrigeration units, but only some may be in use at any given time. For example, if four feed refrigeration units are running but the acid gas fraction in the feed stream drops below the threshold set for use of four feed refrigeration units, one or more of the four feed refrigeration units may be taken out of service. Of course, the number and performance characteristics of the feed refrigeration units 100*a-n* may be varied as desired. Additionally, the acid gas fraction thresholds at which feed refrigeration units 100*a-n* are activated or taken out of commission may vary as desired.

The amount of the feed stream 10 sent by the flow control valve 293 to each feed refrigeration units 100*a-n* in use may be equalized or varied between the feed refrigeration units 100*a-n* in use. For example, the amount of the feed stream 10 sent by the flow control valve 293 to the feed refrigeration units 100*a-n* in use may equalized for all but the last of the feed refrigeration units 100*a-n* in use, where the remaining feed refrigeration unit 100*n* in use may then be configured to process any excess volumes of feed gas. As another example, the amount of the feed stream 10 sent by the control valve 293 to the feed refrigeration units 100*a-n* may be varied to optimize each feed refrigeration unit's capacity so that all but the last feed refrigeration unit is operating at its rated cooling capacity with the last feed refrigeration unit 100*n* being used to process any excess volume of the feed gas.

Returning to FIG. 5, gas and liquids comprising the feed stream 10 exit the feed refrigeration units 100a-n. While it may be desired to route the feed stream 10 to the expander device 102 as shown in FIGS. 1-2, there may be a significant proportion of the feed stream that is liquefied acid gas. In such an instance it may be advantageous to include a feed separator 103 to split the feed stream into a vapor stream (in upper line 12a) and a liquid stream (in lower line 12b). The separator may be a feed separator vessel, a distillation tower feed flash box, or a flash chamber. The expander device may be disposed on the upper line 12a and functions as previously described. A liquid control valve 292 may be placed in lower line 12b. Upper line 12a and lower line 12b transport the vapor stream and liquid stream, respectively, to the distillation tower 104, 204 (FIGS. 3-4) as previously disclosed.

FIG. 6 depicts a liquids processing section 391, similar to the liquids processing section 190, which may be used with the distillation tower 104, 204. In an aspect, the liquids processing section 391 may be used in conjunction with pre-processing section 291 (FIG. 5). The liquid flowing through lines 24 and 28, which may be called a bottoms stream, is rich in carbon dioxide and/or hydrogen sulfide, and can therefore be termed a 'sour liquid.' Because the system is configured to accept a feed stream 10 with varying content of acid gas (i.e., carbon dioxide and hydrogen sulfide), the amount of sour liquid in lines 24 and 28 may vary. To accommodate the varying amount of sour liquid produced by the system, one or more bottoms stream pumps 191a, 191b, 191n may be included. In an aspect, any number of bottoms stream pumps may be employed with the system, and this is expressed by the use of the suffix 'n' when referring to bottoms stream pump 100n. In an aspect, the bottoms stream pumps 191a-n have a standardized or common performance characteristic, which may be a flow rate or a discharge pressure of one of the bottoms stream pumps. In an aspect, the bottoms stream pumps 191a-n are installed in the liquids processing section 391 according to an anticipated need to pump sour liquid from the system. For example, a feed stream 10 having a low fraction acid gas (e.g., less than about 44 mole %) will create a relatively small amount of sour liquid, and therefore only one bottoms stream liquid pump 191a may be needed; however, a feed stream 10 having a higher fraction acid gas (e.g., up to about 63 mole %) will create an increased amount of sour liquid, and two bottoms stream pumps 191a, 191b may be needed. If the feed stream 10 has an even higher fraction acid gas (e.g., up to about 74 mole % or more), the system will create even more sour liquid, and three bottoms stream pumps 191a, 191b, 191n may be needed. The bottoms stream pumps 191a-n are designed to be installed and/or come online/offline according to the need to pump sour liquids out of the liquids processing section 391.

With increased sour liquid in the bottoms stream, there may be a need for additional capability to heat the bottoms stream to extract any remaining hydrocarbons therein. The liquids processing section 391 (FIG. 6) shows a plurality of heat exchangers 112a, 112b, 112n, which may be termed bottoms stream heat exchangers, and which are configured to heat the bottoms stream as described elsewhere herein. In an aspect, any number of bottoms stream heat exchangers may be employed with the system, and this is expressed by the use of the suffix 'n' when referring to bottoms stream heat exchanger 112n. In an aspect, the bottoms stream heat exchangers 112a-n have a standardized or common performance characteristic, which may be a heating capacity or a power rating of a source of heat associated with each of the heat exchangers. In an aspect, the bottoms stream heat exchangers 112a-n are installed in the liquids processing section 391 according to an anticipated need to heat sour liquid in the bottoms stream. The bottoms stream heat exchangers 112a-n are designed to be installed and/or come online/offline according to the need to heat sour liquid in the bottoms stream.

For example, the bottoms stream heat exchangers 112a-n may also be designed to be activated based on the methane content in the bottoms stream. Thus, if the methane content is greater than 1 mole %, or greater than 1.5 mole %, this may indicate that increased heating duty in the reboiler system is needed.

A feature of the disclosure is that varied or increased feed stream volumes can be processed by the system because a substantial portion of the sour gas contained therein is liquefied in the heat exchangers 100a-n prior to entering the distillation tower 104, 204. In an aspect, this liquefied acid gas is fed into the lower section 106 and exits the lower section 106 through the liquid outlet 160 to be heated by the bottoms stream heat exchangers 112a-n and pumped out of the system by the bottoms stream pump(s) 191a-n. The feed refrigeration units 100a-n, the bottoms stream heat exchangers 112a-n, and bottoms stream pumps 191a-n may be maintained so that the middle freezing section 108 is processing a vapor/liquid having a substantially constant acid gas fraction, such as between about 10 mole % and about 30 mole % acid gas, or between about 15 mole % and about 25 mole % acid gas, or between about 18 mole % and about 23 mole % acid gas, or about 21 mole % acid gas. In this manner, a standardized distillation tower 104, 204 design may be used for any gas processing facility, regardless of possible acid gas concentrations in the feed stream.

The method may include maintaining an upper section 110. The upper section 110 operates as previously discussed. The method may also include separating the feed stream in the upper section 110 as previously discussed.

A method of treating, in a gas treatment plant, feed gas including hydrocarbon gas and acid gas is described herein. The method may comprise cooling and liquefying at least part of the acid gas in a first feed gas stream using a first feed refrigeration unit. The first feed gas stream has a first acid gas fraction. The liquefied acid gas is separated from the first feed gas stream to create a first vapor stream having a first composition. Substantially all of the acid gas remaining in the first vapor stream is separated from the first vapor stream, primarily by freezing, to create a hydrocarbon gas stream. The frozen acid gas is melted. The melted acid gas and the liquefied acid gas are removed to form a bottoms stream. The hydrocarbon gas stream is then removed. When a second feed gas stream, having a second acid gas fraction substantially higher than the first acid gas fraction, is to be treated, part of the acid gas in the second feed gas stream is liquefied using the first feed refrigeration unit and at least one additional feed refrigeration unit, and the liquefied acid gas is separated from the second feed gas stream to create a second vapor stream having a second composition. The second composition is substantially similar to the first composition. The frozen acid gas from the second feed gas stream is then melted and removed to the bottoms stream.

An additional method of processing a feed gas stream may be as follows. Introducing a feed gas stream to a pre-processing system, wherein the pre-processing system comprises a dehydration unit, a contaminant detection unit, a flow control valve, and two or more feed refrigeration units. The feed stream may be dehydrated in the dehydration unit. The contaminant detection unit is used to determine the concentration of acid gas contaminants, such as carbon dioxide, in the feed stream. The acid gas concentration is then used to determine the flow of the feed gas through the flow control valve into the two or more feed refrigeration units. For example, if the acid gas concentration in the feed stream is less than a first threshold, such as less than 30 mole %, or less than 32 mole %, or less than 35 mole %, or less than 40 mole %, the flow control valve directs the entire feed stream into the first feed refrigeration unit. However, if the acid gas concentration in the feed stream is greater than the first threshold and less than a second threshold, such as less than 50 mole %, or less than 52 mole %, or less than 55 mole %, or less than 58 mole %, then the flow control valve directs a first portion of the feed stream to the first feed refrigeration unit and the remaining portion of the feed stream to the second feed refrigeration unit. Further, if the acid gas concentration in the feed stream is greater than the second threshold and is less than a third threshold, such as 60 mole %, or less than 63 mole %, or less than 65 mole %, or less than 67 mole %, then the flow control valve directs a first portion of the feed stream to the first feed refrigeration unit, a second portion of the feed stream to the second feed refrigeration unit, and the remaining portion of the feed stream to a third feed refrigeration unit. Likewise, if the acid gas concentration in the feed stream is greater than the third threshold and is less than fourth threshold, such as less than 70 mole %, or less than 71 mole %, or less than 72 mole %, or less than 76 mole %, or less than 78 mole %, then the flow control valve directs a first portion of the feed stream to the first feed refrigeration unit, a second portion of the feed stream to the second feed refrigeration unit, a third portion of the feed stream to a third feed refrigeration unit, and a fourth portion of the feed stream to a fourth feed refrigeration unit. Each of the streams coming from the two or more feed refrigeration units are then introduced to the cryogenic distillation column, wherein the acid gases are separated from the methane in the feed stream.

A method of designing and constructing a hydrocarbon gas treatment plant may be as follows. A target hydrocarbon production range for a hydrocarbon gas meeting a required product specification is established. A cryogenic distillation column is designed and constructed with a vapor capacity to meet the target hydrocarbon production range. An overhead refrigeration and separation system is designed and constructed with a vapor capacity to meet the target hydrocarbon production range. A variable feed refrigeration system is incorporated to cool an inlet feed of the hydrocarbon gas. The variable feed refrigeration system is designed to handle the target hydrocarbon production range and a wide range of contaminant concentrations in the inlet feed. A variable bottoms heating system is incorporated which is capable of handling heating duties associated with the wide range of contaminant concentrations in the inlet feed. A variable bottoms pumping system is incorporated which is capable of handling liquid flows associated with the wide range of contaminant concentrations in the inlet feed.

Disclosed aspects may be used in hydrocarbon management activities. As used herein, "hydrocarbon management" or "managing hydrocarbons"" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used in extracting hydrocarbons from a subsurface region and processing the hydrocarbons. Hydrocarbons and contaminants may be extracted from a reservoir and processed. The hydrocarbons and contaminants may be processed, for example, in the distillation tower previously described. After the hydrocarbons and contaminants are processed, the hydrocarbons may be extracted from the processor, such as the distillation tower, and produced. The contaminants may be discharged into the Earth, etc. For example, the method for producing hydrocarbons disclosed herein may include producing the hydrocarbon-enriched vapor stream extracted from the distillation tower. The method may also include removing the hydrocarbon-enriched vapor stream from the distillation tower before producing the hydrocarbon-enriched vapor stream. The initial hydrocarbon extraction from the reservoir may be accomplished by drilling a well using hydrocarbon drilling equipment. The equipment and techniques used to drill a well and/or extract these hydrocarbons are well known by those skilled in the relevant art. Other hydrocarbon extraction activities and, more generally, other hydrocarbon management activities, may be performed according to known principles.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

The articles "the," "a" and "an" are not necessarily limited to mean only one, but rather are inclusive and open ended so as to include, optionally, multiple such elements.

What is claimed is:

1. A method of treating, in a gas treatment plant, a feed gas stream comprising hydrocarbon gas and acid gas, the method comprising:
    (a) measuring an acid gas concentration in the feed gas stream at a first time to determine a first acid gas fraction, wherein the first acid gas fraction is less than a threshold value;
    (b) cooling and liquefying the feed gas stream in at least one first feed refrigeration unit to produce a liquefied acid gas;
    (c) separating the liquefied acid gas from the feed gas stream in a feed separator to create a first vapor stream;

(d) passing the first vapor stream through an expander device located between the feed separator and a cryogenic distillation column to produce an expanded first vapor stream;

(e) introducing the expanded first vapor stream into the distillation column via a first inlet:

(f) introducing the liquefied acid gas separated from the feed gas stream into the distillation column via a second inlet;

(g) in the cryogenic distillation column, separating, by freezing, from the expanded first vapor stream acid gas remaining in the first vapor stream to create frozen acid gas and a hydrocarbon gas stream;

(h) melting the frozen acid gas to create melted acid gas;

(i) removing, from the cryogenic distillation column, the melted acid gas and the liquefied acid gas separated from the feed gas stream, which combine together to form a first bottoms stream, and pumping the first bottoms stream using at least one first bottoms stream pump;

(j) removing the hydrocarbon gas stream from the cryogenic distillation column;

(k) measuring the acid gas concentration in the feed gas stream at a second time to determine a second acid gas fraction, wherein the second acid gas fraction is greater than the threshold value and the feed gas stream is treated by:

separating the feed gas stream into a first portion and a second portion so that in step (b) the at least one first feed refrigerant unit cools and liquefies the first portion of the feed gas stream;

cooling and liquefying the second portion of the feed gas stream using at least one additional feed refrigeration unit to produce an additional liquefied acid gas;

combining the cooled first portion and the cooled second portion of the feed gas stream to produce a combined cooled feed gas stream;

separating the liquefied acid gas from the combined cooled feed gas stream to create a second vapor stream;

passing the second vapor stream through the expander device located between the feed separator and the cryogenic distillation column to produce an expanded second vapor stream;

introducing the expanded second vapor stream into the distillation column via the first inlet;

introducing the liquefied acid gas separated from the combined cooled feed gas stream into the distillation column via the second inlet;

in the cryogenic distillation column, separating, by freezing, from the expanded second vapor stream acid gas remaining in the second vapor stream to create additional frozen acid gas and an additional hydrocarbon gas stream;

melting the additional frozen acid gas to create additional melted acid gas;

removing, from the cryogenic distillation column, the additional melted acid gas and the liquefied acid gas separated from the combined cooled feed gas stream, which combine together to form a second bottoms stream, and pumping the second bottoms stream using the at least one first bottoms stream pump; and removing the additional hydrocarbon gas stream from the cryogenic distillation column; wherein the threshold value is 40 mole % of the acid gas in the feed gas stream.

2. The method of claim 1, wherein each of the additional feed refrigeration units has a performance characteristic in common with the first feed refrigeration unit.

3. The method of claim 2, wherein the performance characteristic is a cooling capacity of the first feed refrigeration unit.

4. The method of claim 2, wherein the performance characteristic is a power rating of the source of refrigeration.

5. The method of claim 1, further comprising adding at least one second bottoms stream pump when the acid gas concentration in the feed gas stream increases above the threshold value.

6. The method of claim 5, wherein each second bottoms stream pump has a performance characteristic in common with the at least one first bottoms stream pump, wherein the performance characteristic is selected from a flow rate of the at least one first bottoms stream pump and a discharge pressure of the at least one first bottoms stream pump.

7. The method of claim 1, further comprising:
heating the first bottoms stream to remove residual hydrocarbon gas therefrom.

8. The method of claim 7, wherein the heating of the first bottoms stream is accomplished using a first bottoms stream heat exchanger.

9. The method of claim 8, further comprising:
heating the second bottoms stream to remove residual hydrocarbon gas therefrom using the first bottoms stream heat exchanger and at least one additional bottoms stream heat exchanger.

10. The method of claim 9, wherein the at least one additional bottoms stream heat exchanger being utilized has a heating duty that is based on the second acid gas fraction.

11. The method of claim 1, wherein:
the cryogenic distillation column comprises a stripper section and a freezing section disposed above the stripper section, and
the first inlet and the second inlet introduce both the first vapor stream and the liquefied acid gas separated from the feed gas stream, respectively, into the stripper section or the freezing section such that the first vapor stream and the liquefied acid gas separated from the feed gas stream are introduced into the same section of the cryogenic distillation column.

12. The method of claim 1, wherein the liquefied acid gas separated from the feed gas stream is passed through a liquid control valve located between the feed separator and the cryogenic distillation column and is introduced into the distillation column via the second inlet.

13. The method of claim 1, wherein:
the cryogenic distillation column comprises a stripper section and a freezing section disposed above the stripper section, and
the first inlet and the second inlet introduce both the second vapor stream and the liquefied acid gas separated from the combined cooled feed gas stream, respectively, into the stripper section or the freezing section such that the second vapor stream and the liquefied acid gas separated from the combined cooled feed gas stream are introduced into the same section of the cryogenic distillation column.

14. The method of claim 1, wherein the liquefied acid gas separated from the combined cooled feed gas stream is passed through a liquid control valve located between the feed separator and the cryogenic distillation column and is introduced into the distillation column via the second inlet.

15. The method of claim 1, wherein the acid gas concentration in each of the first vapor stream and the second vapor stream is substantially the same and in a range of 10 mole % to 30 mole %.

16. The method of claim 1, wherein:
the cryogenic distillation column comprises a stripper section and a freezing section disposed above the stripper section,
the first inlet and the second inlet introduce both the first vapor stream and the liquefied acid gas separated from the first portion of the feed gas stream, respectively, into the freezing section,
the liquefied acid gas separated from the feed gas stream is passed through a liquid control valve located between the feed separator and the cryogenic distillation column and is introduced into the distillation column via the second inlet,
the first inlet and the second inlet introduce both the second vapor stream and the liquefied acid gas separated from the combined cooled feed gas stream, respectively, into the freezing section,
the liquefied acid gas separated from the combined cooled feed gas stream is passed through the liquid control valve located between the feed separator and the cryogenic distillation column and is introduced into the distillation column via the second inlet, and
the acid gas concentration in each of the first vapor stream and the second vapor stream is substantially the same and in a range of 10 mole % to 30 mole %.

17. The method of claim 1, wherein the liquefied acid gas separated from the feed gas stream is passed through an expander device located between the feed separator and the cryogenic distillation column and is introduced into the distillation column via the second inlet.

18. The method of claim 17, wherein the liquefied acid gas separated from the combined cooled feed gas stream is passed through the expander device located between the feed separator and the cryogenic distillation column and is introduced into the distillation column via the second inlet.

* * * * *